US012697611B2

(12) United States Patent
Zhao et al.

(10) Patent No.: US 12,697,611 B2
(45) Date of Patent: Aug. 4, 2026

(54) DIGITAL MICROFLUIDICS CHIP AND DRIVE METHOD THEREOF, AND DIGITAL MICROFLUIDICS APPARATUS

(71) Applicants: Beijing BOE Sensor Technology Co., Ltd., Beijing (CN); BOE Technology Group Co., Ltd., Beijing (CN)

(72) Inventors: Yingying Zhao, Beijing (CN); Le Gu, Beijing (CN); Bolin Fan, Beijing (CN); Wenliang Yao, Beijing (CN); Qiuxu Wei, Beijing (CN); Yongjia Gao, Beijing (CN); Li Yang, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 876 days.

(21) Appl. No.: 17/921,637

(22) PCT Filed: Oct. 27, 2021

(86) PCT No.: PCT/CN2021/126811
§ 371 (c)(1),
(2) Date: Oct. 27, 2022

(87) PCT Pub. No.: WO2023/070393
PCT Pub. Date: May 4, 2023

(65) Prior Publication Data
US 2024/0238781 A1 Jul. 18, 2024

(51) Int. Cl.
*B01L 3/00* (2006.01)

(52) U.S. Cl.
CPC ... *B01L 3/502715* (2013.01); *B01L 3/502784* (2013.01); *B01L 2300/18* (2013.01)

(58) Field of Classification Search
CPC ......... B01L 3/502715; B01L 3/502784; B01L 2300/18; B01L 3/502792; B01L 3/00
See application file for complete search history.

(56) References Cited

U.S. PATENT DOCUMENTS

| | | | | |
|---|---|---|---|---|
| 2011/0220505 | A1 | 9/2011 | Wang et al. | |
| 2018/0250672 | A1 | 9/2018 | Jamshidi et al. | |
| 2019/0049434 | A1 | 2/2019 | Blainey et al. | |
| 2019/0358636 | A1* | 11/2019 | Jia | B01L 7/52 |

(Continued)

FOREIGN PATENT DOCUMENTS

| | | | |
|---|---|---|---|
| CN | 102671722 | A | 9/2012 |
| CN | 107754962 | A | 3/2018 |
| CN | 108473927 | A | 8/2018 |

(Continued)

*Primary Examiner* — Brian J. Sines

(57) ABSTRACT

A digital microfluidics chip and a drive method thereof, and a digital microfluidics apparatus are provided. The digital microfluidics chip includes a first substrate (1) and a second substrate (2) which are oppositely disposed, the first substrate (1) is provided with a plurality of drive regions for driving a droplet to move, at least one drive region includes a drive transistor (50), a drive electrode (60), and a storage capacitor, the drive electrode (60) is connected with the drive transistor (50) and the storage capacitor respectively, and the storage capacitor is configured to be charged when the drive transistor (50) is turned on, and to maintain a voltage signal on the drive electrode (60) when the drive transistor (50) is turned off.

19 Claims, 16 Drawing Sheets

(56) References Cited

U.S. PATENT DOCUMENTS

| | | | |
|---|---|---|---|
| 2022/0341925 A1 | 10/2022 | Li et al. | |

FOREIGN PATENT DOCUMENTS

| | | | |
|---|---|---|---|
| CN | 108855266 | A | 11/2018 |
| CN | 107255710 | B | 7/2019 |
| CN | 209791582 | U | 12/2019 |
| CN | 111208119 | A | 5/2020 |
| CN | 113275052 | A | 8/2021 |
| WO | 2021007724 | A1 | 1/2021 |

* cited by examiner

DIGITAL MICROFLUIDICS CHIP AND DRIVE METHOD THEREOF, AND DIGITAL MICROFLUIDICS APPARATUS

CROSS-REFERENCE TO RELATED APPLICATION

The present application is a U.S. National Phase Entry of International Application No. PCT/CN2021/126811 having an international filing date of Oct. 27, 2021. The above-identified application is hereby incorporated by reference.

TECHNICAL FIELD

The present disclosure relates to, but is not limited to, the field of micro-electro-mechanical technologies, in particular to a digital microfluidics chip and a drive method thereof, and a digital microfluidic apparatus.

BACKGROUND

With development of Micro-Electro-Mechanical Systems (MEMS) technologies, a digital microfluidics technology has made a breakthrough in drive and control and other aspects of micro-droplets, and has been widely used in biology, chemistry, medicine, and other fields depending on its own advantages.

The digital microfluidics technology is a new interdisciplinary subject involving chemistry, fluid physics, microelectronics, new materials, biology, and biomedical engineering, and can achieve accurate control and manipulation on tiny droplets. Due to characteristics of miniaturization, integration, and etc., an apparatus using the microfluidics technology is usually referred to as a digital microfluidics chip, which is an important part of a Laboratory on a Chip (LOC) system. Various cells and other samples may be cultured, moved, detected, and analyzed in the digital microfluidics chip, which has advantages of less sample consumption, fast detection speed, simple operation, multi-functional integration, small size, easy portability, etc.

SUMMARY

The following is a summary of subject matters described herein in detail. The summary is not intended to limit the protection scope of claims.

In one aspect, an embodiment of the present disclosure provides a digital microfluidics chip, including a first substrate and a second substrate disposed oppositely, wherein a plurality of drive regions are disposed on the first substrate, at least one drive region includes a drive transistor, a drive electrode, and a storage capacitor, the drive electrode is connected with the drive transistor and the storage capacitor respectively, the storage capacitor is configured to be charged when the drive transistor is turned on, and to maintain a voltage signal on the drive electrode when the drive transistor is turned off.

In an exemplary implementation mode, a plurality of gate lines and a plurality of data lines are disposed on the first substrate, the plurality of gate lines and the plurality of data lines cross each other to define a plurality of drive regions, in at least one drive region, the drive transistor includes at least a first gate electrode, a second gate electrode, a first electrode, and a second electrode, the first gate electrode and the second gate electrode are connected with a gate line, the first electrode is connected with a data line, and the second electrode is connected with the drive electrode.

In an exemplary implementation mode, the at least one drive region further includes a capacitor electrode, an orthographic projection of the capacitor electrode on the first substrate and an orthographic projection of the drive electrode on the first substrate are at least partially overlapped, and the capacitor electrode and the drive electrode form the storage capacitor.

In an exemplary implementation mode, the capacitor electrode is connected with a system ground signal.

In an exemplary implementation mode, in the at least one drive region, the first substrate includes: a first base substrate; a first conductive layer disposed on the first base substrate, wherein the first conductive layer includes at least a gate line, a first gate electrode, and a second gate electrode, and the first gate electrode and the second gate electrode are respectively connected with a gate line; a first insulation layer covering the first conductive layer; a semiconductor layer disposed on a side of the first insulation layer away from the first base substrate, wherein the semiconductor layer includes at least a first active layer and a second active layer, an orthographic projection of the first active layer on the first base substrate is at least partially overlapped with an orthographic projection of the first gate electrode on the first base substrate, and an orthographic projection of the second active layer on the first base substrate is at least partially overlapped with an orthographic projection of the second gate electrode on the first base substrate; a second conductive layer disposed on a side of the semiconductor layer away from the first base substrate, wherein the second conductive layer includes at least a data line, a first electrode, a connection electrode, and a second electrode, a first terminal of the first electrode is connected with the data line, a second terminal of the first electrode and a first terminal of the connection electrode are respectively disposed on the first active layer, and a second terminal of the connection electrode and a first terminal of the second electrode are respectively disposed on the second active layer; a second insulation layer covering the second conductive layer; a third conductive layer disposed on a side of the second insulation layer away from the first base substrate, wherein the third conductive layer includes at least a capacitor electrode; a third insulation layer covering the third conductive layer, wherein a connection via is disposed on the third insulation layer, and the connection via exposes the second electrode; and a fourth conductive layer disposed on a side of the third insulation layer away from the first base substrate, wherein the fourth conductive layer includes at least a drive electrode, the drive electrode is connected with the second electrode through the connection via, an orthographic projection of the drive electrode on the first base substrate is at least partially overlapped with an orthographic projection of the capacitor electrode on the first base substrate, and the capacitor electrode and the drive electrode form the storage capacitor.

In an exemplary implementation mode, a plurality of opposite electrodes are provided on the second substrate, and the drive electrode and an opposite electrode form a drive unit for driving a droplet to move.

In an exemplary implementation mode, the first substrate and the second substrate form a processing cavity through a sealant, the processing cavity includes at least a screening region, a cracking region, a pre-amplification region, and a library preparation region, the screening region is configured to perform screening and enrichment of a rare cell, the cracking region is disposed on a side of the screening region, and is configured to perform simplification and cell cracking of the rare cell being performed screening and enrichment, the pre-amplification region is disposed on a side of the cracking region away from the screening region, and is configured to perform nucleic acid pre-amplification of a rare single cell being performed cell cracking, and the library preparation region is disposed on a side of the pre-amplification region away from the screening region, and is configured to perform library preparation for a sample being performed pre-amplification of the rare single cell.

In an exemplary implementation mode, the screening region includes a plurality of drive units, and a screening region first reagent port, a screening region second reagent port, a screening region third reagent port, and a screening region fourth reagent port respectively disposed in corner regions of the screening region, at least one of the screening region first reagent port, the screening region second reagent port, the screening region third reagent port, and the screening region fourth reagent port is configured to receive a whole blood sample, or to receive magnetic nanoparticles, or to receive a buffer liquid, or to discharge a waste liquid.

In an exemplary implementation mode, the screening region includes a first magnetic field region, the first magnetic field region includes a plurality of first magnetic regions arranged regularly, and an orthographic projection of at least one first magnetic region on the first substrate contains an orthographic projection of at least one drive unit on the first substrate.

In an exemplary implementation mode, the screening region includes a plurality of drive units, and a cracking region first reagent port, a cracking region second reagent port, a cracking region third reagent port, and a cracking region fourth reagent port respectively disposed in corner regions of the screening region, at least one of the cracking region first reagent port, the cracking region second reagent port, the cracking region third reagent port, and the cracking region fourth reagent port is configured to receive a cracking liquid, or to receive a termination liquid, or to receive a buffer liquid, or to discharge a waste liquid.

In an exemplary implementation mode, a drive unit in the screening region satisfies a following formula:

$$\frac{L}{H} = -\sqrt{2}\tan\theta$$

Herein θ represents an initial contact angle between a droplet and a hydrophobic surface on the first substrate, H represents a box thickness of the digital microfluidics chip, and L represents a size of a drive electrode.

In an exemplary implementation mode, the box thickness H of the digital microfluidics chip is less than or equal to 19.8 μm, and the size L of the drive electrode is less than or equal to 48.5 μm.

In an exemplary implementation mode, a drive unit in the screening region is configured to detect an impedance signal of a single cell wrapping and a vacuole, and an impedance of the single cell wrapping includes a resistance of a cytoplasm and a capacitance of a cell membrane wrapping the cytoplasm.

In an exemplary implementation mode, the pre-amplification region includes a plurality of drive units, and a pre-amplification region first reagent port, a pre-amplification region second reagent port, a pre-amplification region third reagent port, and a pre-amplification region fourth reagent port respectively disposed in corner regions of the pre-amplification region, at least one of the pre-amplification region first reagent port, the pre-amplification region second reagent port, the pre-amplification region third reagent port, and the pre-amplification region fourth reagent port is configured to receive a fragmented enzyme reagent, or to receive a pre-amplification reagent, or to receive a fragmentation buffer liquid, or to discharge a waste liquid.

In an exemplary implementation mode, the pre-amplification region includes a plurality of amplification temperature regions having different temperatures, and a distance between adjacent amplification temperature regions is greater than or equal to 1 mm.

In an exemplary implementation mode, the library preparation region includes a plurality of drive units, and a preparation region first reagent port, a preparation region second reagent port, a preparation region third reagent port, a preparation region fourth reagent port, a preparation region fifth reagent port, a preparation region sixth reagent port, a preparation region seventh reagent port, a preparation region eighth reagent port, a preparation region ninth reagent port, a preparation region tenth reagent port, and a preparation region eleventh reagent port respectively disposed in edge regions of the library preparation region; the preparation region first reagent port, the preparation region second reagent port, the preparation region third reagent port, the preparation region fourth reagent port, and the preparation region fifth reagent port are disposed in an edge region on a side of the library preparation region in a second direction, and are sequentially disposed along a first direction, the preparation region sixth reagent port, the preparation region seventh reagent port, the preparation region eighth reagent port, the preparation region ninth reagent port, and the preparation region tenth reagent port are disposed in an edge region on a side of the library preparation region in an opposite direction of the second direction, and are sequentially disposed along a first direction, the preparation region eleventh reagent port is disposed in an edge region on a side of the library preparation region in the first direction; at least one of a plurality of preparation region reagent ports of the library preparation region is configured to: receive a clean-up beads liquid, or receive an end repair master mix liquid, or receive a size selection beads liquid, or receive an eluent liquid, or receive a library amplification master mix liquid, or receive an A-tailing master mix liquid, or receive an adapter liquid, or receive a ligation master mix liquid, or receive a wash buffer liquid, or receive a primer, or discharge a waste liquid.

In an exemplary implementation mode, the library preparation region includes a plurality of polymerization temperature regions having different temperatures, and a distance between adjacent polymerization temperature regions is greater than or equal to 0.5 mm.

In an exemplary implementation mode, the library preparation region includes a second magnetic field region, the second magnetic field region includes a plurality of second magnetic regions arranged regularly, and an orthographic projection of at least one second magnetic region on the first substrate contains an orthographic projection of at least one drive unit on the first substrate.

In another aspect, an embodiment of the present disclosure further provides a digital microfluidic apparatus, including the digital microfluidics chip as described above, and further including a temperature control apparatus, a magnetic control apparatus, and a detection apparatus, wherein the temperature control apparatus is configured to generate at least one temperature region on the digital microfluidics chip, the magnetic control apparatus is configured to generate at least one magnetic field region on the digital microfluidics chip, the detection apparatus is configured to identify and locate a rare cell, and the digital microfluidics chip is configured to sequentially perform screening and enrichment of a rare cell, simplification and cell cracking of the rare cell, nucleic acid pre-amplification of a rare single cell, and sample library preparation.

In yet another aspect, an embodiment of the present disclosure further provides a drive method for a digital microfluidics chip, wherein the digital microfluidics chip includes a screening region, a cracking region, a pre-amplification region, and a library preparation region disposed in sequence, and the drive method includes: performing screening and enrichment of a rare cell in the screening region; performing simplification and cell cracking of the rare cell being performed screening and enrichment in the cracking region; performing nucleic acid pre-amplification of a rare single cell being performed cell cracking in the pre-amplification region; and performing library preparation for a sample being performed pre-amplification of the rare single cell in the library preparation region.

Other aspects may be understood upon reading and understanding the drawings and the detailed description.

BRIEF DESCRIPTION OF DRAWINGS

Accompanying drawings are intended to provide further understanding for technical solutions of the present disclosure and form a portion of the specification, and are intended to explain the technical solutions of the present disclosure together with embodiments of the present application and do not constitute a limitation on the technical solutions of the present disclosure. Shapes and sizes of various components in the drawings do not reflect actual scales, and are only intended to schematically illustrate contents of the present disclosure.

Figure 1:
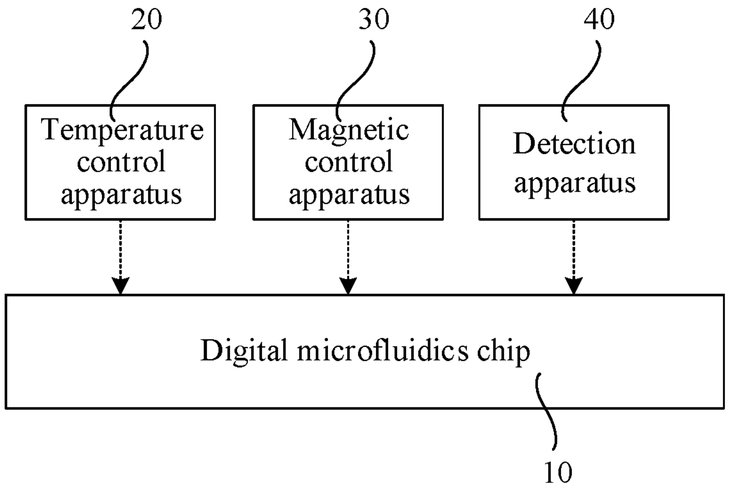
FIG. 1 is a schematic diagram of a structure of a digital microfluidics apparatus according to an exemplary embodiment of the present disclosure.

Reference signs are described as follows.

| | | |
|---|---|---|
| 1-first substrate; | 2-second substrate; | 10-digital microfluidics chip; |
| 11-first base substrate; | 12-first structure layer; | 13-first lyophobic layer; |
| 20-temperature control apparatus; | 20-1 - first temperature control apparatus; | 20-2 - second temperature control apparatus; |
| 21-second base substrate; | 22-second structure layer; | 23-second lyophobic layer; |
| 30-magnetic control apparatus; | 30-1 - first magnetic control apparatus; | 30-2 - second magnetic control apparatus; |
| 31-first gate electrode; | 32-second gate electrode; | 33-first active layer; |
| 34-second active layer; | 35-first electrode; | 36-connection electrode; |
| 37-second electrode; | 38-capacitance electrode; | 40-detection apparatus; |
| 50-drive transistor; | 51-gate line; | 52-data line; |
| 60-drive electrode; | 61-first insulation layer; | 62-second insulation layer; |
| 63-third insulation layer; | 64-fourth insulation layer; | 70-opposite electrode; |
| 100-screening region; | 110-first magnetic field region; | 111-first magnetic region; |
| 200-cracking region; | 210-detection region; | 300 - pre-amplification region; |
| 310-first amplification temperature region; | 320-second amplification temperature region; | 400-library preparation region; |

-continued

| | | |
|---|---|---|
| 420-first polymerization temperature region; | 430-second polymerization temperature region; | 440-third polymerization temperature region; |
| 450-second magnetic field region; | 451-second magnetic region. | |

DETAILED DESCRIPTION

Specific implementation modes of the present disclosure will be described further in detail below with reference to accompanying drawings and embodiments. Following embodiments serve to illustrate the present disclosure, but are not intended to limit the scope of the present disclosure. It should be noted that the embodiments in the present application and features in the embodiments may be arbitrarily combined with each other if there is no conflict.

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

Scales of the drawings in the present disclosure may be used as a reference in the actual process, but are not limited thereto. For example, the width-length ratio of the channel, the thickness and spacing of each film layer, and the width and spacing of each signal line may be adjusted according to the actual needs. The number of pixels in the display substrate and the number of sub-pixels in each pixel are not limited to the number shown in the drawings. The drawings described in the present disclosure are schematic structure diagrams only, and one implementation of the present disclosure is not limited to the shapes, numerical values or the like shown in the drawings.

Ordinal numerals such as “first”, “second”, and “third” in the specification are set to avoid confusion of constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, “electrical connection” includes a case that constituent elements are connected together through an element with a certain electrical effect. The “element with the certain electrical effect” is not particularly limited as long as electrical signals may be sent and received between the connected constituent elements. Examples of the “element with the certain electrical effect” not only include electrodes and wirings, but also include switch elements such as transistors, resistors, inductors, capacitors, other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be guide angle, arc edge and deformation, etc.

In the present disclosure, “about” refers to that a boundary is defined not so strictly and numerical values within process and measurement error ranges are allowed.

Since launch of the Human Genome Project, a high-throughput sequencing technology has been rapidly developed. However, a tissue sample in traditional sequencing contain thousands of cells, which are mixed together to obtain whole genome sequence information of all cells, so a final sequencing result reflects an average value of all gene signals in a group of cells, or represents genetic information of cells with obvious advantages in number, so it is difficult to distinguish heterogeneity in a group of cells by this sequencing analysis. In order to make up for this defect, a single-cell sequencing technology came into being. The single-cell sequencing technology refers to performing sequencing on genetic information carried by a single cell at a level of the single cell, aiming at obtaining a gene sequence, a transcription book, protein, and epigenetic expression spectrum information of a cell type at a molecular level. By performing sequencing of DeoxyriboNucleic Acid (DNA) and RiboNucleic Acid (RNA) on a rare single cell, a situation of cell mutation of a single cell level may be understood with high precision, which has been widely used in many research fields such as tumor heterogeneity, embryonic stem cell differentiation, and microbial community diversity.

A single cell sequencing process of a rare sample mainly includes three acts: (1) obtaining a single cell sample; (2) cracking and performing library preparation for an obtained single cell; (3) performing high-throughput sequencing analysis. In order to perform sequencing on the rare sample single cell, rare single cells interested need to be separated first. At present, a traditional single cell separation technology relies more on a manual operation, not only it is easy to cause loss and damage of a rare sample in an operation process, but also a manual manner is complex, a process is cumbersome, time is long, and there is an extremely high error rate in database building. For example, although a traditional gradient dilution method has characteristics of a simple operation and a low cost, it is prone to operation errors and poor specificity. For another example, for a traditional streaming cell sorting technology, although sorting has a high degree of specificity, this method has a demand for large quantity of samples, and may cause a mechanical damage to cells. For another example, although a laser capture micro-cutting technology has characteristics of accuracy, rapidity, and visualization, this method requires a manual operation, and it is easy to destroy cell integrity. Therefore, for a traditional single cell separation technology, it is difficult to avoid loss and damage of a rare sample, moreover, even if a single cell sample is obtained, it is very difficult to optimize quality of library construction at a rare single cell level, and it is difficult for a library output by a manual operation to meet needs of deep sequencing. These problems affect processing quality of a sample before sequencing on a rare single cell, and hinder clinical application and popularization of a rare single cell sequencing technology. Therefore, there is an urgent need for a solution of a rare single cell sample capture-separation-library preparation integration.

A digital microfluidics chip uses a principle of Electrowetting on Dielectric (EWOD), a droplet is disposed on a surface having a hydrophobic layer, with help of an electrowetting effect, wettability between the droplet and the hydrophobic layer is changed by applying a voltage to the droplet, so that a pressure difference and asymmetric deformation are generated inside the droplet, furthermore, directional movement of the droplet may be achieved, and the droplet may be moved, mixed, and separated at micron scale. It has a capability to miniaturize basic functions of a biological laboratory, a chemical laboratory, etc. to a chip of several square centimeters, and has advantages of a small size, portability, flexible combination of functions, a high integration degree, etc.

Digital microfluidics is divided into active digital microfluidics and passive digital microfluidics. A main difference between them is that active digital microfluidics is to drive droplets in an array mode, which may accurately control a droplet at a position to move alone, while passive digital microfluidics is that droplets at all positions are moved or stopped together. An active digital microfluidics technology may achieve independent control of drive electrodes by setting Thin Film Transistors (TFTs) to control the drive electrodes, thus achieving accurate control of droplets. Compared with a passive digital microfluidics technology, for M×N drive electrodes, the passive digital microfluidic technology needs M×N control signals, while the active digital microfluidics technology only needs M+N control signals with its row addressing and column addressing drive modes, and M and N are positive integers greater than 1. Therefore, active digital microfluidics is more suitable for manipulating high-throughput samples, and may achieve arbitrary programmable movement paths of single/multiple droplets, and multiple samples may be manipulated simultaneously and in parallel. Process flows of the active digital microfluidics technology may be compatible with fabrication of electrical and optical sensors, and allow electrical detection, optical detection, and other means to be integrated into a chip to form a multi-functional active digital microfluidics chip laboratory.

An exemplary embodiment of the present disclosure provides a digital microfluidics apparatus of a rare single cell capture-separation-library preparation automation and integration based on an active digital microfluidics chip.

FIG. 1 is a schematic diagram of a structure of a digital microfluidics apparatus according to an exemplary embodiment of the present disclosure. As shown in FIG. 1, the digital microfluidics apparatus may include a digital microfluidics chip 10, a temperature control apparatus 20, a magnetic control apparatus 30, and a detection apparatus 40, The temperature control apparatus 20 is configured to generate at least one temperature region on the digital microfluidics chip 10, the magnetic control apparatus 30 is configured to generate at least one magnetic field region on the digital microfluidics chip 10, the detection apparatus 40 is configured to identify and position a rare cell, and the digital microfluidics chip 10 is configured to sequentially perform screening and enrichment of a rare cell, simplification and cell cracking of a rare cell, nucleic acid pre-amplification of a rare single cell, and sample library preparation, achieving automated, integrated rare single cell capture, separation, and library preparation.

Figure 2:
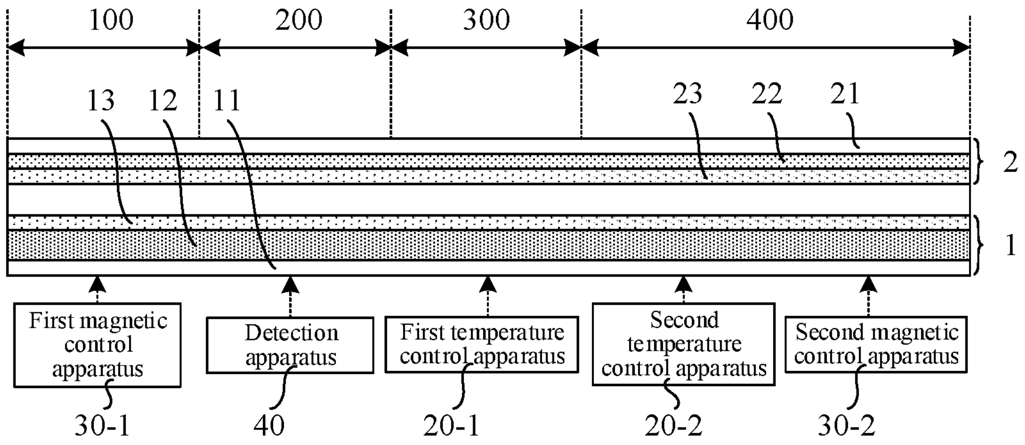
FIG. 2 is a schematic diagram of a sectional structure of a digital microfluidics chip according to an exemplary embodiment of the present disclosure.
Figure 3:
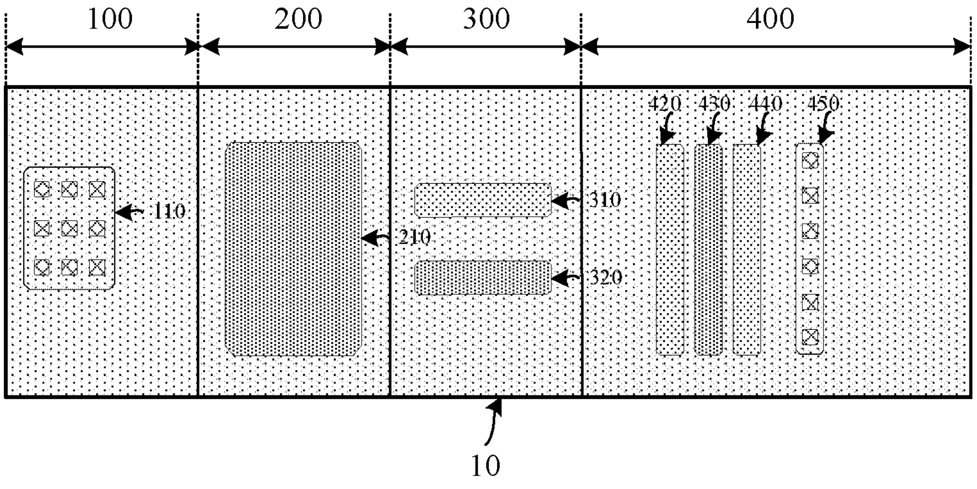
FIG. 3 is a schematic diagram of a planar structure of a digital microfluidics chip according to an exemplary embodiment of the present disclosure.

FIG. 2 is a schematic diagram of a sectional structure of a digital microfluidics chip according to an exemplary embodiment of the present disclosure, and FIG. 3 is a schematic diagram of a planar structure of the digital microfluidics chip of FIG. 2. As shown in FIGS. 2 and 3, in an exemplary implementation mode, the digital microfluidics chip 10 may include a first substrate 1 and a second substrate 2 disposed oppositely, the first substrate 1 may include a first base substrate 11, a first structure layer 12 disposed on a side of the first base substrate 11 facing the second substrate 2, and a first lyophobic layer 13 disposed on a side of the first structure layer 12 facing the second substrate 2, the second substrate 2 may include a second base substrate 21, a second structure layer 22 disposed on a side of the second base substrate 21 facing the first substrate 1, and a second lyophobic layer 23 disposed on a side of the second structure layer 22 facing the first substrate.

In an exemplary implementation mode, the first substrate 1 and the second substrate 2 disposed oppositely may be cell-assembled through a sealant, the first substrate 1, the second substrate 2, and the sealant together form a closed processing cavity and a processed sample may be disposed in the processing cavity. In an exemplary implementation mode, the processing cavity may be divided into multiple functional regions arranged in sequence, and the multiple functional regions may include at least a screening region 100, a cracking region 200, a pre-amplification region 300, and a library preparation region 400, wherein the cracking region 200 is disposed on a side of the screening region 100, the pre-amplification region 300 is disposed on a side of the cracking region 200 away from the screening region 100, and the library preparation region 400 is disposed on a side of the pre-amplification region 300 away from the screening region 100. In an exemplary implementation mode, the screening region 100 is configured to perform screening and enrichment of a rare cell, the cracking region 200 is configured to perform simplification and cell cracking of the rare cell being screened and enriched, the pre-amplification region 300 is configured to perform nucleic acid pre-amplification of a rare single cell being cell-cracked, and the library preparation region 400 is configured to perform library preparation for the samples being performed the pre-amplification of the rare single cell.

In an exemplary implementation mode, the detection apparatus 40 may be disposed on a side of the first substrate 1 away from the second substrate 2, or disposed on a side of the second substrate 2 away from the first substrate 1, a position of the detection apparatus 40 is corresponding to a region where the cracking region 200 is located, and the detection apparatus 40 is configured to form a detection region 210 in the cracking region 200, identify and position a droplet containing a rare cell in the detection region 210.

In an exemplary implementation mode, the temperature control apparatus 20 may include at least a first temperature control apparatus 20-1 and a second temperature control apparatus 20-2.

In an exemplary implementation mode, the first temperature control apparatus 20-1 may be disposed on a side of the first substrate 1 away from the second substrate 2, or disposed on a side of the second substrate 2 away from the first substrate 1, a position of the first temperature control apparatus 20-1 is corresponding to a region where the pre-amplification region 300 is located, and the first temperature control apparatus 20-1 is configured to generate a plurality of amplification temperature regions having different temperatures in the pre-amplification region 300. For example, the first temperature control apparatus 20-1 may generate a first amplification temperature region 310 and a second amplification temperature region 320 in the pre-amplification region 300. In an exemplary implementation mode, the first amplification temperature region 310 and the second amplification temperature region 320 are configured to implement a pre-amplification processing of a rare single cell.

In an exemplary implementation mode, the second temperature control apparatus 20-2 may be disposed on a side of the first substrate 1 away from the second substrate 2, or disposed on a side of the second substrate 2 away from the first substrate 1, a position of the second temperature control apparatus 20-2 is corresponding to a region where the library preparation region 400 is located, and the second temperature control apparatus 20-2 is configured to generate a plurality of polymerization temperature regions having different temperatures in the library preparation region 400. For example, the second temperature control apparatus 20-2 may generate a first polymerization temperature region 420, a second polymerization temperature region 430, and a third polymerization temperature region 440 in the library preparation region 400. In an exemplary implementation mode, the first polymerization temperature region 420, the second polymerization temperature region 430, and the third polymerization temperature region 440 are configured to implement a Polymerase Chain Reaction (PCR) thermal cycling processing.

In an exemplary implementation mode, the first temperature control apparatus 20-1 and the second temperature control apparatus 20-2 may include a heater, a temperature sensor, and a controller, etc. The heater forms a closed-loop control with the temperature sensor and the controller to accurately and efficiently control temperature of a hot region.

In an exemplary implementation mode, the magnetic control apparatus 30 may include at least a first magnetic control apparatus 30-1 and a second magnetic control apparatus 30-2.

In an exemplary implementation mode, the first magnetic control apparatus 30-1 may be disposed on a side of the first substrate 1 away from the second substrate 2, or disposed on a side of the second substrate 2 away from the first substrate 1, a position of the first magnetic control apparatus 30-1 is corresponding to a region where the screening region 100 is located, and the first magnetic control apparatus 30-1 is configured to generate at least one first magnetic field region 110 in the screening region 100. In an exemplary implementation mode, the at least one first magnetic field region 110 is configured to implement a capture processing of a rare cell, and the first magnetic field region 110 may include a plurality of first magnetic fields arranged regularly.

In an exemplary implementation mode, the second magnetic control apparatus 30-2 may be disposed on a side of the first substrate 1 away from the second substrate 2, or disposed on a side of the second substrate 2 away from the first substrate 1, a position of the second magnetic control apparatus 30-2 is corresponding to a region where the library preparation region 400 is located, and the second magnetic control apparatus 30-2 is configured to generate at least one second magnetic field region 450 in the library preparation region 400. In an exemplary implementation mode, the at least one second magnetic field region 450 is configured to implement a sample purification processing, and the second magnetic field region 450 may include a plurality of second magnetic fields arranged regularly.

In an exemplary implementation mode, the first magnetic control apparatus 30-1 and the second magnetic control apparatus 30-2 may include a permanent magnet or an electromagnet, a controller, etc., and the controller controls a formed magnetic field region and a strength of the magnetic field by adjusting a distance between the permanent magnet and the first substrate or the second substrate or by turning on and off power of the electromagnet.

In an exemplary implementation mode, the temperature control apparatus 20 and the magnetic control apparatus 30 may be disposed separately or in combination to form a temperature control and magnetic control integrated apparatus.

Figure 4:
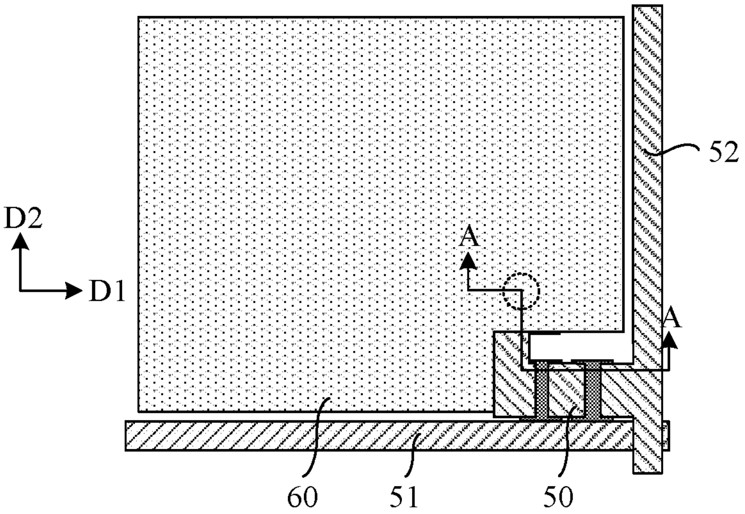
FIG. 4 is a schematic diagram of a planar structure of a first substrate according to an exemplary embodiment of the present disclosure.
Figure 5:
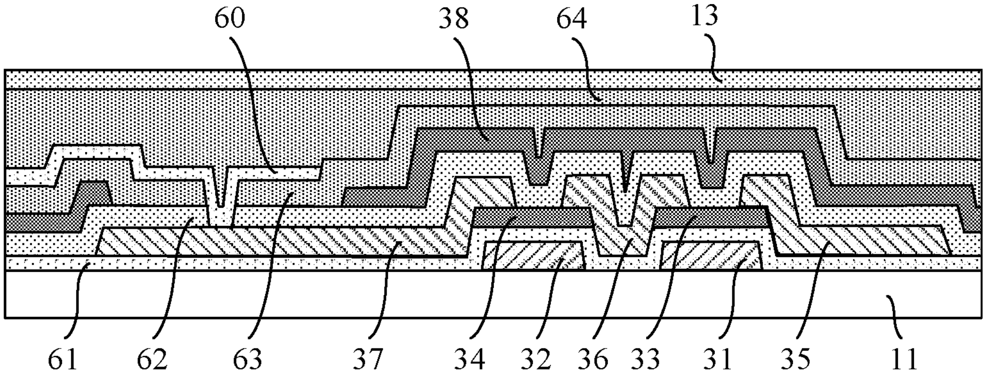
FIG. 5 is a sectional view taken along an A-A direction in FIG. 4.

FIG. 4 is a schematic diagram of a planar structure of a first substrate according to an exemplary implementation mode of the present disclosure, and FIG. 5 is a sectional view taken along an A-A direction in FIG. 4. In an exemplary implementation mode, an active drive implementation mode is adopted for a drive array of a digital microfluidics chip, which can accurately control separate movement of each droplet. A first substrate may include a first base substrate, a first structure layer disposed on a side of the first base substrate facing a second substrate, and a first lyophobic layer disposed on a side of the first structure layer facing the second substrate. The first structure layer may include at least a gate line, a data line, a drive transistor, and a drive electrode. As shown in FIGS. 4 and 5, on a plane parallel to the first substrate, the first substrate may include a plurality of gate lines 51 extending along a first direction D1 and a plurality of data lines 52 extending along a second direction D2, the plurality of gate lines 51 and the plurality of data lines 52 are intersected to each other to form a plurality of drive regions arranged in an array, the first direction D1 and the second direction D2 are intersected. At least one drive region is provided with a drive transistor 50 and a drive electrode 60, an array of drive electrodes is formed on the first substrate, and the drive transistor 50 is connected with a gate line 51, a data line 52, and a drive electrode 60 in a drive region where the drive transistor 50 is located, respectively. The gate line 51 is configured to provide a scan signal to a corresponding drive transistor 50, and in response to the scan signal of the gate line, the drive transistor 50 is turned on, and a data voltage from the data line 52 is applied to the drive electrode 60.

In an exemplary implementation mode, on a plane perpendicular to the first substrate, the first substrate may include: a first base substrate 11; a first conductive layer disposed on the first base substrate 11, wherein the first conductive layer may include at least a gate line 51, and a first gate electrode 31 and a second gate electrode 32 located in each drive unit, the first gate electrode 31 and the second gate electrode 32 are respectively connected with the gate line 51; the first substrate may further include: a first insulation layer 61 covering the first conductive layer; a semiconductor layer disposed on a side of the first insulation layer 61 away from the first base substrate, wherein the semiconductor layer may include at least a first active layer 33 and a second active layer 34 located in each drive unit, an orthographic projection of the first active layer 33 on the first base substrate is at least partially overlapped with an orthographic projection of the first gate electrode 31 on the first base substrate, and an orthographic projection of the second active layer 34 on the first base substrate is at least partially overlapped with an orthographic projection of the second gate electrode 32 on the first base substrate; the first substrate may further include: a second conductive layer disposed on a side of the semiconductor layer away from the first base substrate, wherein the second conductive layer may include at least a data line 52, and a first electrode 35, a connection electrode 36, and a second electrode 37 located in each drive unit. A first terminal of the first electrode 35 is connected with a data line 52, and a second terminal of the first electrode 35 is disposed on a side of the first active layer 33 close to the data line 52; a first terminal of the connection electrode 36 is disposed on a side of the first active layer 33 away from the data line 52, and a second terminal of the connection electrode 36 is disposed on a side of the second active layer 34 close to the data line 52; a first terminal of the second electrode 37 is disposed on a side of the second active layer 34 away from the data line 52 and a second terminal of the second electrode 37 is disposed on the first insulation layer 61; a first channel is formed between the second terminal of the first electrode 35 and the first terminal of the connection electrode 36, and a second channel is formed between the second terminal of the connection electrode 36 and the first terminal of the second electrode 37; the first substrate may further include: a second insulation layer 62 covering the second conductive layer; a third conductive layer disposed on a side of the second insulation layer 62 away from the first base substrate, wherein the third conductive layer may include at least a capacitor electrode 38 located in each drive unit, an orthographic projection of the capacitor electrode 38 on the first base substrate contains orthographic projections of the first channel and the second channel on the first base substrate; the first substrate may further include: a third insulation layer 63 covering the third conductive layer, wherein a connection via is provided on the third insulation layer 63, and the third insulation layer 63 and the second insulation layer 62 in the connection via are removed to expose a surface of the second electrode 37; the first substrate may further include: a fourth conductive layer disposed on a side of the third insulation layer 63 away from the first base substrate, wherein the fourth conductive layer may include at least a drive electrode 60 located in each drive unit, the drive electrode 60 is connected with the second electrode 37 through the connection via, and an orthographic projection of the drive electrode 60 on the first base substrate is at least partially overlapped with the orthographic projection of the capacitor electrode 38 on the first base substrate; the first substrate may further include: a fourth insulation layer 64 covering the fourth conductive layer, wherein the fourth insulation layer 64 may be referred to as a dielectric layer; and the first substrate may further include: a first lyophobic layer 13 provided on a side of the fourth insulation layer 64 away from the first base substrate.

In an exemplary implementation mode, the first direction D1 may be a horizontal direction, the second direction D2 may be a vertical direction, and the first direction D1 and the second direction D2 are perpendicular.

In an exemplary implementation mode, the first gate electrode 31, the second gate electrode 32, the first active layer 33, the second active layer 34, the first electrode 35, the connection electrode 36, and the second electrode 37 form a drive transistor 50 with a dual-gate structure, the drive transistor 50 is connected with the gate line 51, the data line 52, and the drive electrode 60, respectively, i.e. the first gate electrode 31 and the second gate electrode 32 in the drive transistor 50 are connected with the gate line 51, the first electrode 35 in the drive transistor 50 is connected with the data line 52, and the second electrode 37 in the drive transistor 50 is connected with the drive electrode 60, achieving independent control and addressing of the drive electrode 60 in each drive unit.

In an exemplary implementation mode, the first gate electrodes 31 and the second gate electrode 32, and the gate line 51, may be connected with each other to be of an integral structure, and the first electrode 35 and the data line 52 may be connected with each other to be of an integral structure.

In an exemplary implementation mode, the first electrode may be a drain electrode and the second electrode may be a source electrode; or, the first electrode may be a source electrode and the second electrode may be a drain electrode.

In an exemplary implementation mode, the capacitor electrode 38 and the drive electrode 60 may form a storage capacitor $C_{st}$, and the storage capacitor $C_{st}$ is configured to hold a voltage of the drive electrode 60 within a period of time. In an exemplary implementation mode, the drive electrode 60 is connected with the second electrode 37 in the drive transistor 50, and the capacitor electrode 38 may be connected with a ground signal (GND) of a system. When the drive transistor 50 is turned on, a data voltage (e.g. 20V) transmitted by a data line 52 is output to the drive electrode 60 through the drive transistor 50, and because there is a voltage difference between the drive electrode 60 and the capacitor electrode 38, the storage capacitor $C_{st}$ is charged. After the drive transistor 50 is turned off, the storage capacitor $C_{st}$ may hold a voltage on the drive electrode 60 at a set holding voltage $V_{hold}$ for time T (T is greater than or equal to Electrowetting on Dielectric reaction time $T_{drop}$ of a droplet), so as to ensure smooth deformation of the droplet and achieve effective manipulation of the droplet.

In an exemplary implementation mode, in order to ensure effective manipulation of the droplet, the set holding voltage $V_{hold}$ is generally greater than or equal to a threshold voltage $V_{drop\text{-}th}$ of droplet drive, i.e. $V_{hold} \geq V_{drop\text{-}th}$. Because the set holding voltage $V_{hold}$ is related to a capacitance value of the storage capacitor $C_{st}$, an appropriate set holding voltage $V_{hold}$ may be obtained by designing an appropriate capacitance value of the storage capacitor $C_{st}$.

In an exemplary implementation mode, the capacitance value of the storage capacitor $C_{st}$ is proportional to an opposite area of the capacitor electrode 38 and the drive electrode 60, a vacuum dielectric constant, and a dielectric constant of the third insulation layer, is inversely proportional to a thickness of the third insulation layer between the capacitor electrode 38 and the drive electrode 60 (i.e., a pitch between the capacitor electrode 38 and the drive electrode 60), so that an appropriate capacitance value of the storage capacitor $C_{st}$ may be obtained by adjusting the opposite area of the capacitor electrode 38 and the drive electrode 60 and the pitch between the capacitor electrode 38 and the drive electrode 60.

In an exemplary implementation mode, because the orthographic projection of the capacitor electrode 38 on the first base substrate contains the orthographic projections of the first channel and the second channel on the first base substrate, the capacitor electrode 38 may be used as a shielding layer to shade natural light from an external environment, prevent the natural light from directly irradiating a channel of a drive transistor, and avoid affecting an electrical performance of the drive transistor.

It is found from researches that there are problems in a traditional digital microfluidics chip, such as uncontrollable droplet deformation and failure of droplet manipulation. Further researches show that a reason for the problems of uncontrollable droplet deformation and failure of droplet manipulation in the traditional digital microfluidics chip is caused by a change in characteristics of a drive transistor. In order to achieve controllable deformation of a droplet, especially fine manipulation (such as generation, splitting, and mixing) of a tiny droplet (such as a pL-grade droplet), a relatively large drive voltage is usually adopted for a drive electrode. For example, the drive voltage is usually greater than or equal to 20 V. Because a drive transistor with a single-gate structure is adopted for a traditional digital microfluidics chip, however, when the drive transistor with the single-gate structure is turned on at a high voltage, its electrical performance is prone to deteriorate, such as a relatively large threshold voltage offset, a relatively large leakage current, and even breakdown, which leads to problems of uncontrollable droplet deformation and failure of droplet manipulation, and cannot achieve parallel accurate control of a plurality of droplets. According to the exemplary embodiments of the present disclosure, a drive transistor with a dual-gate structure is adopted and it has characteristics of high voltage resistance, a low leakage current, and stable performance, a threshold voltage offset and a leakage current are effectively reduced, the problems of uncontrollable droplet deformation and failure of droplet manipulation are effectively avoided, fine manipulation of a tiny droplet may be achieved, and parallel accurate control of a plurality of droplets may be achieved.

Exemplary description is made below through a preparation process of the first substrate. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. Deposition may be any one or more of sputtering, evaporation, and chemical vapor deposition. Coating may be any one or more of spray coating, spin coating, and ink-jet printing. Etching may be any one or more of dry etching and wet etching, which is not limited in present disclosure. A "thin film" refers to a layer of thin film made of a material on a base substrate through a process such as deposition, coating, etc. If the "thin film" does not need a patterning process in an entire preparation process, the "thin film" may also be called a "layer". If the "thin film" needs a patterning process in an entire preparation process, it is called a "thin film" before the patterning process, and called a "layer" after the patterning process. The "layer" after the patterning process includes at least one "pattern". "A and B being disposed on a same layer" mentioned in the present disclosure means that A and B are formed simultaneously through a same patterning process, and a "thickness" of a film layer is a dimension of the film layer in a direction perpendicular to a display substrate. In an exemplary embodiment of the present disclosure, "an orthographic projection of B is within a range of an orthographic projection of A" refers to a boundary of the orthographic projection of B falling within a range of a boundary of the orthographic projection of A, or a boundary of the orthographic projection of A is overlapped with a boundary of the orthographic projection of B.

In an exemplary implementation mode, a preparation process of a first substrate in a digital microfluidics chip according to the embodiment of the present disclosure may include following operations.

Figure 6A:
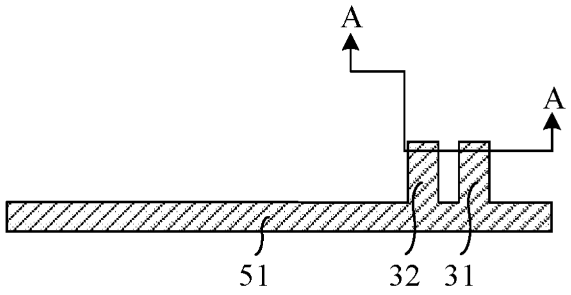
FIG. 6*a* and FIG. 6*b* are schematic diagrams obtained after a pattern of a first conductive layer is formed according to an embodiment of the present disclosure.
Figure 6B:
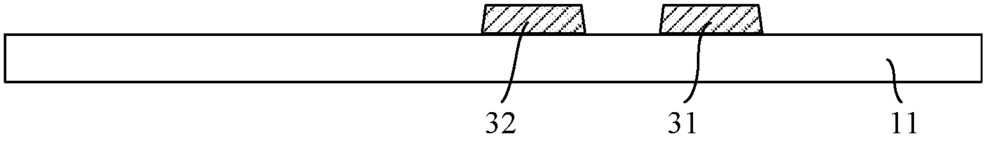

(1) A pattern of a first conductive layer is formed on a first base substrate. In an exemplary implementation mode, forming the pattern of the first conductive layer may include: depositing a first conductive thin film on the first base substrate, patterning the first conductive thin film through a patterning process to form the pattern of the first conductive layer on a first base substrate 11, wherein the pattern of the first conductive layer may include at least a gate line 51, a first gate electrode 31, and a second gate electrode 32, both the first gate electrode 31 and the second gate electrode 32 are connected with the gate line 51, as shown in FIGS. 6*a* and 6*b*, and FIG. 6*b* is a sectional view taken along an A-A direction in FIG. 6*a*.

Figure 7A:
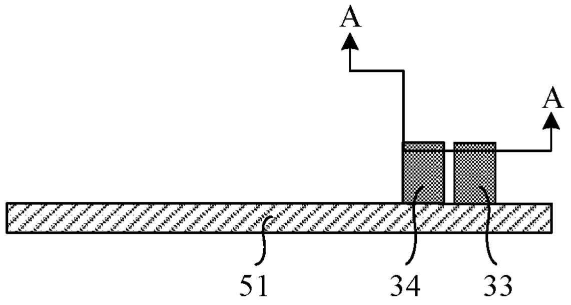
FIG. 7*a* and FIG. 7*b* are schematic diagrams obtained after a pattern of a semiconductor layer is formed according to an embodiment of the present disclosure.
Figure 7B:
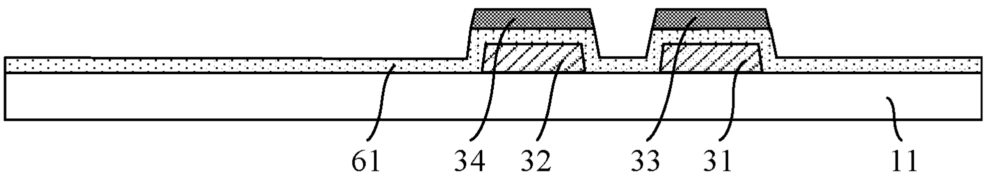

(2) A pattern of a semiconductor layer is formed. In an exemplary implementation mode, forming the pattern of the semiconductor layer may include: sequentially depositing a first insulation thin film and a semiconductor thin film on the first base substrate on which the aforementioned pattern is formed, patterning the semiconductor thin film through a patterning process to form a first insulation layer 61 covering the pattern of the first conductive layer and the pattern of the semiconductor layer disposed on the first insulation layer 61, wherein the pattern of the semiconductor layer includes at least a first active layer 33 and a second active layer 34, an orthographic projection of the first active layer 33 on the first base substrate is at least partially overlapped with an orthographic projection of the first gate electrode 31 on the first base substrate, and an orthographic projection of the second active layer 34 on the first base substrate is at least partially overlapped with an orthographic projection of the second gate electrode 32 on the first base substrate, as shown in FIGS. 7*a* and 7*b*, and FIG. 7*b* is a sectional view taken along an A-A direction in FIG. 7*a*.

Figure 8A:
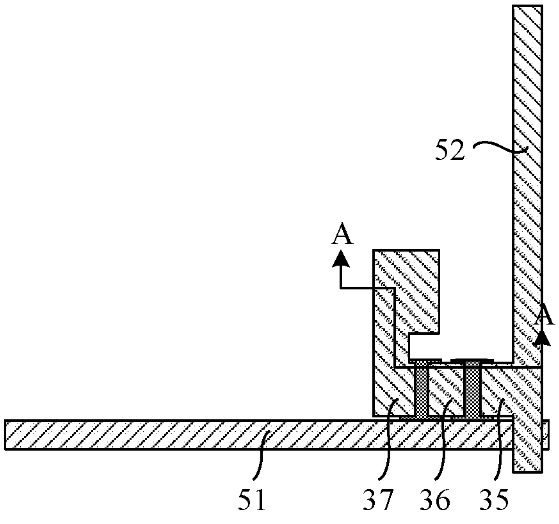
FIG. 8*a* and FIG. 8*b* are schematic diagrams obtained after a pattern of a second conductive layer is formed according to an embodiment of the present disclosure.
Figure 8B:
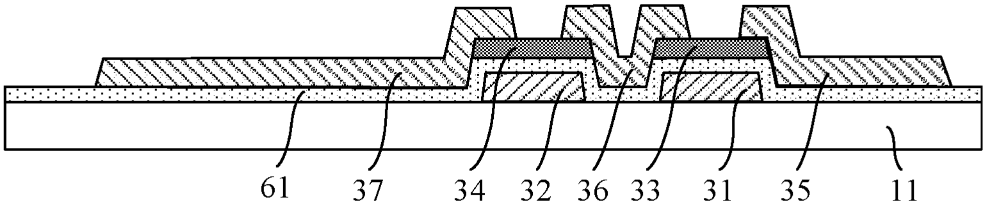

(3) A pattern of a second conductive layer is formed. In an exemplary implementation mode, forming the pattern of the second conductive layer may include: depositing a second conductive thin film on the first base substrate on which the aforementioned patterns are formed, patterning the second conductive thin film through a patterning process to form the pattern of the second conductive layer, wherein the pattern of the second conductive layer may include at least a data line 52, a first electrode 35, a connection electrode 36, and a second electrode 37, a first terminal of the first electrode 35 is connected with the data line 52, a second terminal of the first electrode 35 is disposed on a side of the first active layer 33 close to the data line 52, a first terminal of the connection electrode 36 is disposed on a side of the first active layer 33 away from the data line 52, a second terminal of the connection electrode 36 is disposed on a side of the second active layer 34 close to the data line 52, a first terminal of the second electrode 37 is disposed on a side of the second active layer 34 away from the data line 52, a second terminal of the second electrode 37 is disposed on the first insulation layer, a first channel is formed between the second terminal of the first electrode 35 and the first terminal of the connection electrode 36, and a second channel is formed between the second terminal of the connection electrode 36 and the first terminal of the second electrode 37, as shown in FIGS. 8*a* and 8*b*, and FIG. 8*b* is a sectional view taken along an A-A direction in FIG. 8*a*.

Figure 9A:
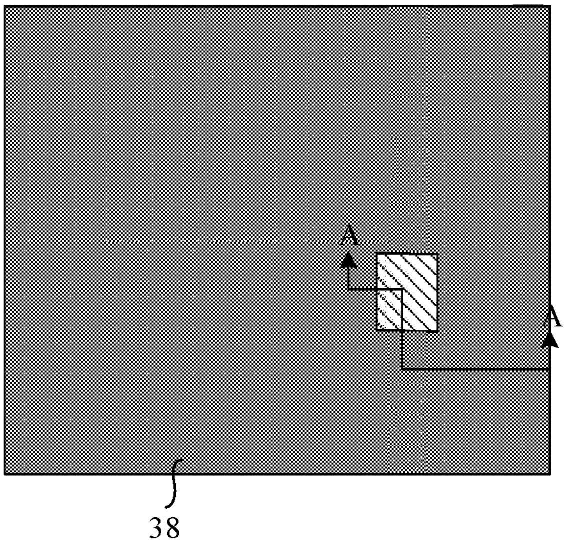
FIG. 9*a* and FIG. 9*b* are schematic diagrams obtained after a pattern of a third conductive layer is formed according to an embodiment of the present disclosure.
Figure 9B:
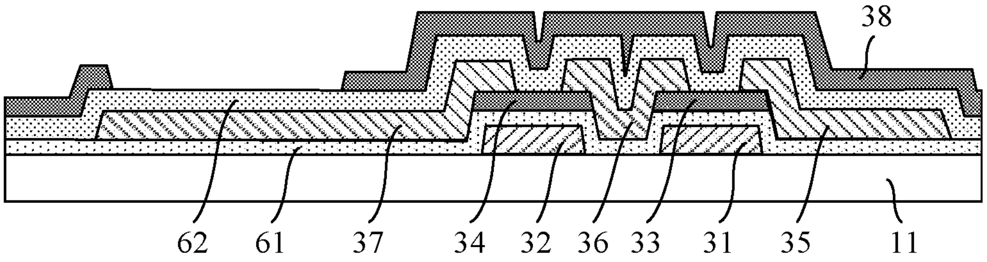

(4) A pattern of a third conductive layer is formed. In an exemplary implementation mode, forming the pattern of the third conductive layer may include: sequentially depositing a second insulation thin film and a third conductive thin film on the first base substrate on which the aforementioned patterns are formed, and patterning the third conductive thin film to form a second insulation layer 62 covering the pattern of the second conductive layer and the pattern of the third conductive layer disposed on the second insulation layer 62. The pattern of the third conductive layer may include at least a capacitor electrode 38, an orthographic projection of the capacitor electrode 38 on the first base substrate may contain orthographic projections of the first channel and the second channel on the first base substrate, as shown in FIGS. 9*a* and 9*b*, and FIG. 9*b* is a sectional view taken along an A-A direction in FIG. 9*a*.

In an exemplary implementation mode, capacitor electrodes 38 of a plurality of drive units may be connected with each other to be of an integral structure and connected with a ground signal (GND) of a system.

Figure 10A:
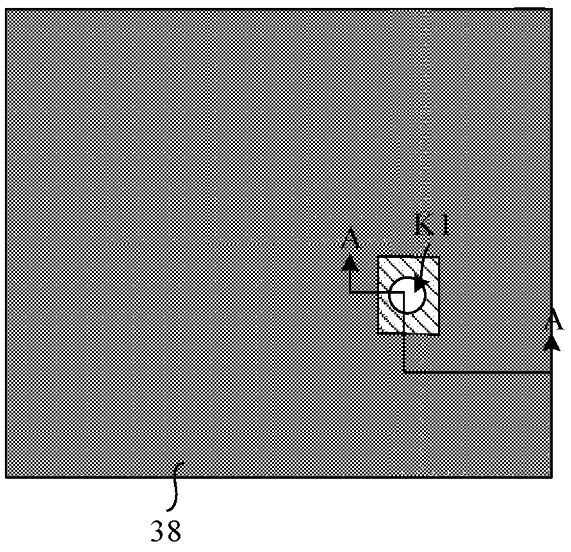
FIG. 10*a* and FIG. 10*b* are schematic diagrams obtained after a pattern of a second insulation layer is formed according to an embodiment of the present disclosure.
Figure 10B:
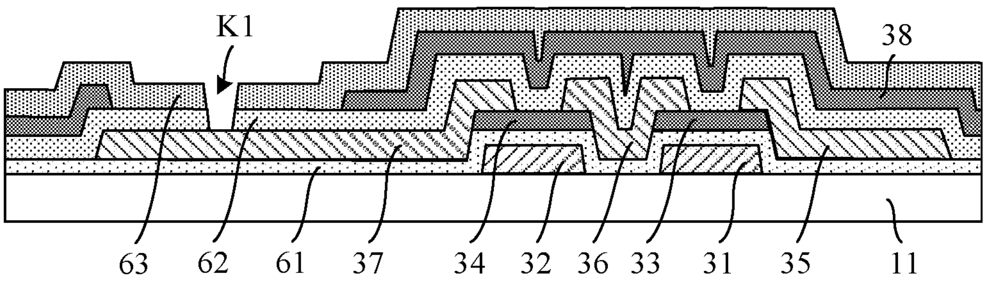

(5) A pattern of a second insulation layer is formed. In an exemplary implementation mode, forming the pattern of the third insulation layer may include: depositing a third insulation thin film on the first base substrate on which the aforementioned patterns are formed, patterning the third insulation thin film through a patterning process to form a pattern of a third insulation layer 63 covering the pattern of the third conductive layer, wherein a connection via K1 is provided on the third insulation layer 63, and the third insulation layer and the second insulation layer in the connection via K1 are removed to expose a surface of the second electrode 37, as shown in FIG. 10*a* and FIG. 10*b*, and FIG. 10*b* is a sectional view taken along an A-A direction in FIG. 10*a*.

Figure 11A:
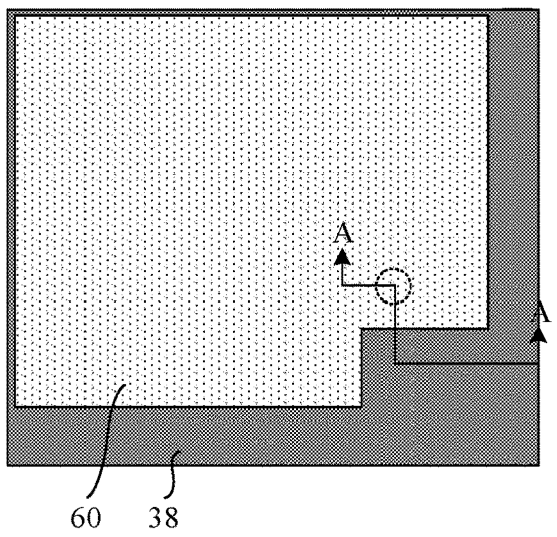
FIG. 11*a* and FIG. 11*b* are schematic diagrams obtained after a pattern of a fourth conductive layer is formed according to an embodiment of the present disclosure.
Figure 11B:
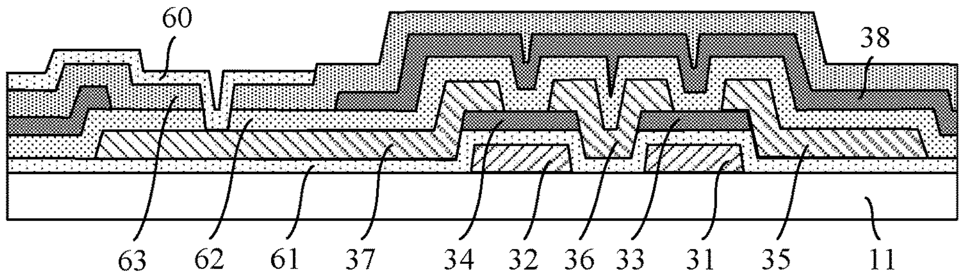

(6) A pattern of a fourth conductive layer is formed. In an exemplary implementation mode, forming the pattern of the fourth conductive layer may include: depositing a fourth conductive thin film on the first base substrate on which the aforementioned patterns are formed, patterning the fourth conductive thin film through a patterning process to form the pattern of the fourth conductive layer on the third insulation layer 63, wherein the pattern of the fourth conductive layer may include at least a drive electrode 60, an orthographic projection of the drive electrode 60 on the first base substrate is at least partially overlapped with an orthographic projection of the capacitor electrode 38 on the first base substrate, the drive electrode 60 is connected with the second electrode 37 through the connection via K1, as shown in FIGS. 11*a* and 11*b*, and FIG. 11*b* is a sectional view taken along an A-A direction in FIG. 11*a*.

(7) Patterns of a dielectric layer and a first hydrophobic layer are formed. In an exemplary implementation mode, forming the patterns of the dielectric layer and the first hydrophobic layer may include: sequentially forming a fourth insulation layer 64 and a first lyophobic layer 13 on the first base substrate on which the aforementioned patterns are formed, as shown in FIG. 5.

In an exemplary implementation mode, a base substrate may be a flexible base substrate, or may be a rigid base substrate. In an exemplary implementation mode, the rigid base substrate may be made of a material such as glass or quartz, the flexible base substrate may be made of a material such as Polyimide (PI), the flexible base substrate may be of a single-layer structure, or may be of a laminated structure formed by an inorganic material layer and a flexible material layer, which is not limited in the present disclosure.

In an exemplary implementation mode, the first insulation layer, the second insulation layer, and the third insulation layer may be made of an inorganic material, and the fourth insulation layer and the first lyophobic layer may be made of an organic material. The inorganic material may be any one or more of Silicon Oxide (SiOx), Silicon Nitride (SiNx), and Silicon Oxynitride (SiON), and may be a single-layer, a multi-layer, or a composite layer. The first insulation layer may be referred to as a Gate Insulation (GI) layer, and the second insulation layer and the third insulation layer may be referred to as Passivation (PVX) layers. The first conductive layer, the second conductive layer, and the third conductive layer may be made of a metal material, such as any one or more of Argentum (Ag), Copper (Cu), Aluminum (Al), Titanium (Ti), and Molybdenum (Mo), or an alloy material of the above metals, such as an Aluminum Neodymium alloy (AlNd) or a Molybdenum Niobium alloy (MoNb), and may be of a single-layer structure, or a multi-layer composite structure. The fourth conductive layer may be made of a transparent conductive material, such as Indium Tin Oxide (ITO) or Indium Zinc Oxide (IZO). The semiconductor layer may be made of various materials, such as amorphous Indium Gallium Zinc Oxide (a-IGZO), Zinc Oxynitride (ZnON), Indium Zinc Tin Oxide (IZTO), amorphous Silicon (a-Si), polycrystalline Silicon (p-Si), hexathiophene, and polythiophene. That is, the present disclosure is applicable to a transistor manufactured based on an oxide technology, a silicon technology, and an organic matter technology.

It should be noted that the above structure and the preparation process thereof are merely exemplary. In an exemplary implementation mode, a corresponding structure may be changed and a patterning process may be increased or decreased according to actual needs, which is not limited in the present disclosure.

In an exemplary implementation mode, the second substrate may include a second base substrate, a second structure layer disposed on a side of the second base substrate facing the first substrate, and a second lyophobic layer disposed on a side of the second structure layer facing the first substrate. In an exemplary implementation mode, the second structure layer may include at least a plurality of opposite electrodes, positions and sizes of the plurality of opposite electrodes may correspond to positions and sizes of drive units on the first substrate, an array of opposite electrodes is formed on the second substrate. An array of drive electrodes of the first substrate and the array of opposite electrodes of the second substrate together form an array of drive units for driving droplets, and each drive unit includes at least a drive electrode and an opposite electrode. In some possible exemplary implementation modes, the second structure layer may include opposite electrodes with an entire surface structure, and the present disclosure is not limited herein.

Figure 12:
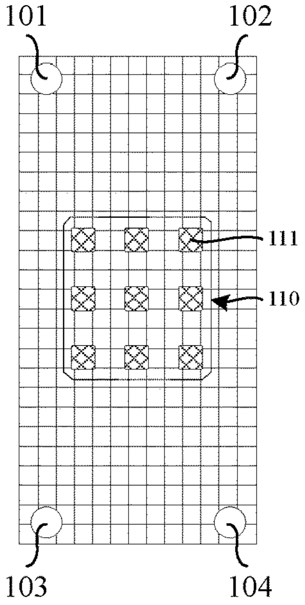
FIG. 12 is a schematic diagram of a planar structure of a screening region according to an exemplary embodiment of the present disclosure.

FIG. 12 is a schematic diagram of a planar structure of a screening region according to an exemplary embodiment of the present disclosure. As shown in FIG. 12, in an exemplary implementation mode, a screening region 100 may include a plurality of drive units and a plurality of screening region reagent ports arranged in a matrix manner, and the plurality of screening region reagent ports may include at least a screening region first reagent port 101, a screening region second reagent port 102, a screening region third reagent port 103, and a screening region fourth reagent port 104 disposed on a second substrate.

In an exemplary implementation mode, the screening region 100 may be in a shape of a rectangle, the plurality of drive units may be arranged in a matrix manner, and the screening region first reagent port 101, the screening region second reagent port 102, the screening region third reagent port 103, and the screening region fourth reagent port 104 may be respectively disposed in four corner regions of the screening region 100, so as to prevent a liquid entering the screening region 100 from a reagent port from contaminating a cell and affecting a cell processing.

In an exemplary implementation mode, the screening region first reagent port 101 may be configured to receive a whole blood sample injected by an external apparatus, the screening region second reagent port 102 may be configured to receive magnetic nanoparticles injected by an external apparatus, the screening region third reagent port 103 may be configured to receive a first buffer liquid injected by an external apparatus, and the screening region fourth reagent port 104 may be configured to discharge a first waste liquid using an external apparatus.

In an exemplary implementation mode, a quantity, a position, a size of a screening region reagent port, and a type of a reagent injected from each screening region reagent port in the screening region 100 may be set according to actual needs. For example, the screening region first reagent port 101 may be configured to receive magnetic nanoparticles and the screening region second reagent port 102 may be configured to receive a whole blood sample, which is not limited in the present disclosure.

In an exemplary implementation mode, a first magnetic control apparatus may be disposed on a side of a first substrate away from a second substrate, or disposed on a side of a second substrate away from a first substrate, a position is corresponding to a region where the screening region 100 is located, and the first magnetic control apparatus is configured to generate a first magnetic field region 110 in the screening region 100, and the first magnetic field region 110 is configured to achieve a capture processing of a rare cell.

In an exemplary implementation mode, the first magnetic field region 110 may include a plurality of first magnetic regions 111 arranged regularly, and an orthographic projection of at least one first magnetic region 111 (a magnetic capture point) on the first substrate contains an orthographic projection of at least one drive unit in the screening region 100 on the first substrate in order to achieve effective magnetic capture. For example, a drive unit may be in a shape of a rectangle, having a first long side and a first wide side. The first magnetic region 111 may be rectangular, having a second long side and a second wide side, a length of the second long side may be greater than or equal to a length of the first long side, a width of the second wide side may be greater than or equal to a width of the first wide side, and an orthographic projection of the drive unit on the first substrate is within a range of an orthographic projection of the first magnetic region 111 on the first substrate.

In an exemplary implementation mode, the first magnetic regions 111 may be block-shaped, a plurality of first magnetic regions 111 may be arranged in a regular arrangement manner, such as a square, a nine-rectangle-grid shape, a shape of a Chinese character "de", a diamond shape, and each block-shaped first magnetic region 111 may cover one drive unit. In another exemplary implementation mode, each block-shaped first magnetic region 111 may cover a plurality of drive units. In yet another exemplary implementation mode, the first magnetic region 111 may be strip-shaped extending along a first direction, a plurality of first magnetic regions 111 may be arranged in sequence along a second direction, and each strip-shaped first magnetic region 111 may cover a plurality of drive units arranged along the first direction, the first direction and the second direction intersecting. In yet another exemplary implementation mode, shapes and sizes of the plurality of first magnetic regions 111 may be the same or may be different, and the present disclosure is not limited herein.

In an exemplary implementation mode, a plurality of drive units in the screening region 100 are configured to perform screening and enrichment of a rare cell. The plurality of drive units in the screening region 100 are configured to: uniformly mix a sample, magnetic nanoparticles, and the first buffer liquid to form a mixed liquid droplet, disperse the mixed liquid droplets into several sub-droplets, move a sub-droplet not captured by the first magnetic field region to a first waste liquid port for discharge, and mix sub-droplets captured by the first magnetic field region into an enriched liquid droplet, wherein the enriched liquid droplet contains a rare cell-magnetic nanoparticles complex.

Figure 13A:
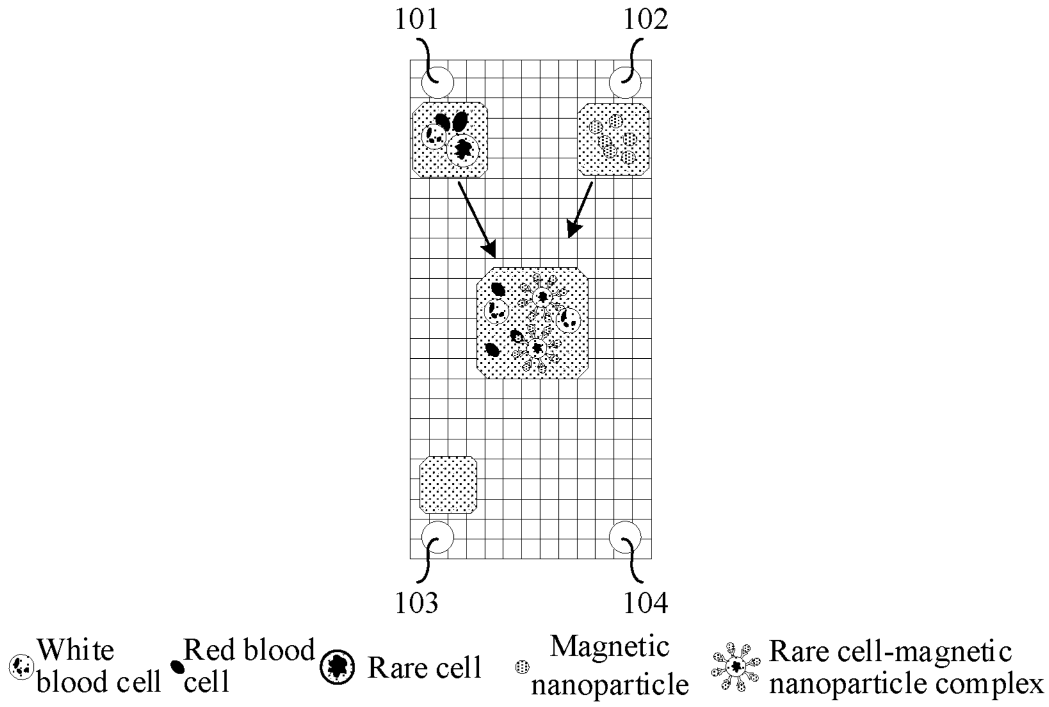
FIGS. 13*a* to 13*c* are schematic diagrams of rare cell screening and enrichment processing according to the present disclosure.
Figure 13B:
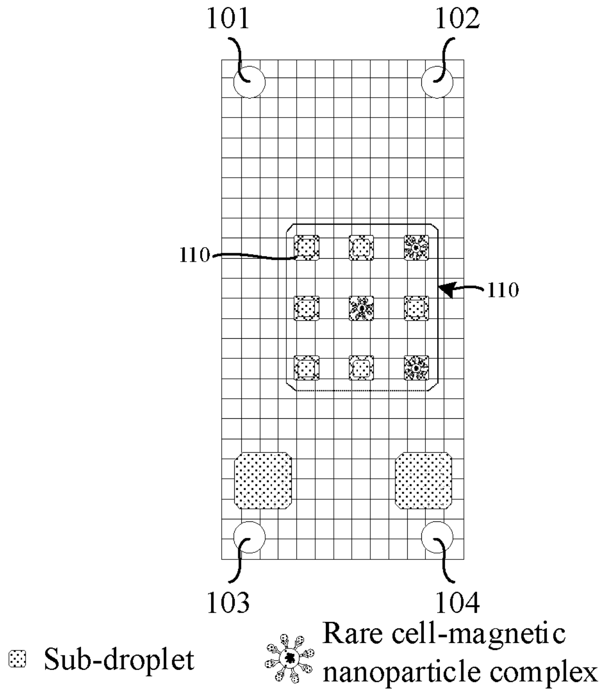
Figure 13C:
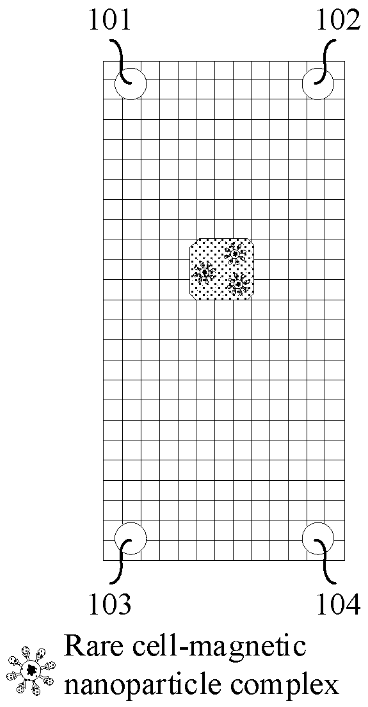

FIGS. 13*a* to 13*c* are schematic diagrams of rare cell screening and enrichment processing in a screening region according to an exemplary embodiment of the present disclosure. In an exemplary implementation mode, the rare cell screening and enrichment process in the screening region includes following acts.

(11) An act of cell-magnetic bead mixing and incubation. A drop of a blood sample, a drop of a magnetic particle droplet and a plurality of drops of the first buffer liquid are injected into the screening region 100 from the screening region first reagent port 101, the screening region second reagent port 102, and the screening region third reagent port 103, respectively, the blood sample contains a red blood cell, a white blood cell, and a rare cell, and the magnetic particle droplet contains several magnetic nanoparticles coupled with special antibodies. Then, a drive unit drives the blood sample, the magnetic particle droplet, and the buffer liquid to mix to form a mixed droplet, by driving the mixed droplet to move back and forth, the mixed droplet is oscillated and mixed for several times to be mixed uniformly, an immune magnetic nanoparticle wrapped with a specificity antibody is fully contacted with a rare cell in the sample, so that the antibody wrapping the magnetic nanoparticle is combined with rare cell surface antigens with specificity, and the rare cell is surrounded by a plurality of magnetic nanoparticles to form a rare cell (target cell)-magnetic nanoparticle complex, as shown in FIG. 13*a*.

(12) An act of capturing a rare cell. Several drops of the first buffer liquid are injected into the screening region 100 from the screening region third reagent port 103, and a drive unit disperses a mixed droplet that has been uniformly mixed into several sub-droplets with equal volume using the first buffer liquid. A first magnetic field region 110 including a plurality of first magnetic regions 111 is formed through a first magnetic control apparatus. When a sub-droplet containing a rare cell-magnetic nanoparticle complex is moved to a position where the first magnetic region 111 is located, the rare cell-magnetic nanoparticle complex is adsorbed on a surface of a first substrate under an action of a magnetic field, thereby achieving capture of a sub-droplet containing the rare cell-magnetic nanoparticle complex. A drive unit drives a sub-droplet not captured by the first magnetic region 111 to move to the screening region fourth reagent port 104 to be discharged, so as to achieve separation of a rare cell from a red cell and a white cell, as shown in FIG. 13*b*.

(13) An act of enrichment of a rare cell. Several drops of the first buffer liquid are injected into the screening region 100 from the screening region third reagent port 103, the first magnetic control apparatus is stopped, the first magnetic field region is canceled, and a drive unit drives the first buffer liquid to mix with a captured sub-droplet to form an enriched droplet, in which a rare cell-magnetic nanoparticle complex is suspended, as shown in FIG. 13*c*.

Figure 14:
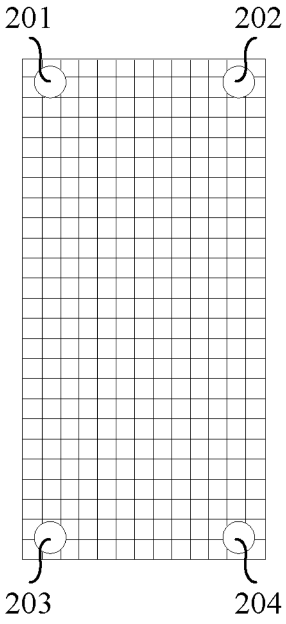
FIG. 14 is a schematic diagram of a planar structure of a cracking region according to an exemplary embodiment of the present disclosure.

FIG. 14 is a schematic diagram of a planar structure of a cracking region according to an exemplary embodiment of the present disclosure. As shown in FIG. 14, in an exemplary implementation mode, a cracking region 200 may include a plurality of drive units arranged in a matrix manner and a plurality of cracking region reagent ports, and the plurality of cracking region reagent ports may include at least a cracking region first reagent port 201, a cracking region second reagent port 202, a cracking region third reagent port 203, and a cracking region fourth reagent port 204 disposed on a second substrate.

In an exemplary implementation mode, the cracking region 200 may be in a shape of a rectangle, the plurality of drive units may be arranged in a matrix manner, and the cracking region first reagent port 201, the cracking region second reagent port 202, the cracking region third reagent port 203, and the cracking region fourth reagent port 204 may be respectively disposed in four corner regions of the cracking region 200, so as to prevent a liquid entering the cracking region 200 from the reagent ports from contaminating a cell and affecting a cell processing.

In an exemplary implementation mode, the cracking region first reagent port 201 may be configured to receive a cracking liquid injected by an external apparatus, the cracking region second reagent port 202 may be configured to receive a termination liquid injected by an external apparatus, the cracking region third reagent port 203 may be configured to receive a second buffer liquid injected by an external apparatus, and the cracking region fourth reagent port 204 may be configured to discharge a second waste liquid using an external apparatus.

In an exemplary implementation mode, a quantity, positions, sizes of cracking region reagent ports in the cracking region 200, and a type of a reagent injected from each cracking region reagent port may be set according to actual needs. For example, the cracking region first reagent port 201 is configured to receive a termination liquid injected by an external apparatus and the cracking region second reagent port 202 is configured to receive a cracking liquid injected by an external apparatus, and the present disclosure is not limited herein.

In an exemplary implementation mode, a plurality of drive units in the cracking region 200 are configured to perform simplification and cell cracking of a rare cell. The plurality of drive units in the cracking region 200 are configured to: disperse an enriched droplet into several sub-droplets, the plurality of sub-droplets are respectively disposed on different drive units, and a drive unit is multiplexed as a detection unit to identify and position a sub-droplet containing a rare cell-magnetic nanoparticle complex, and mix the sub-droplet containing the rare cell-magnetic nanoparticle complex to form a cracking droplet, to obtain a single cell nucleic acid sample.

In an exemplary implementation mode, a detection apparatus may be connected with a plurality of drive units of the cracking region 200, so that the plurality of drive units of the cracking region 200 are multiplexed as a plurality of detection units that identify and position a sub-droplet containing a rare cell-magnetic nanoparticle complex in the cracking region 200, achieving identification and positioning of a rare cell.

Figure 15A:
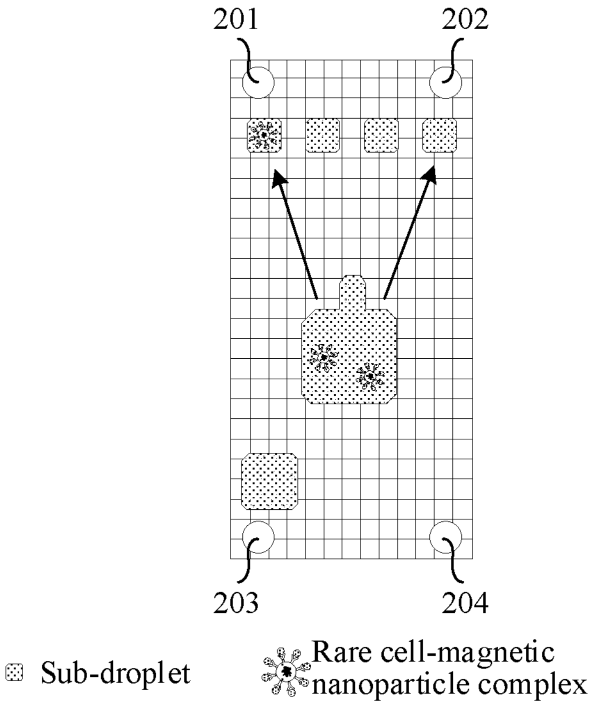
FIGS. 15*a* to 15*c* are schematic diagrams of a rare cell cracking processing according to the present disclosure.
Figure 15B:
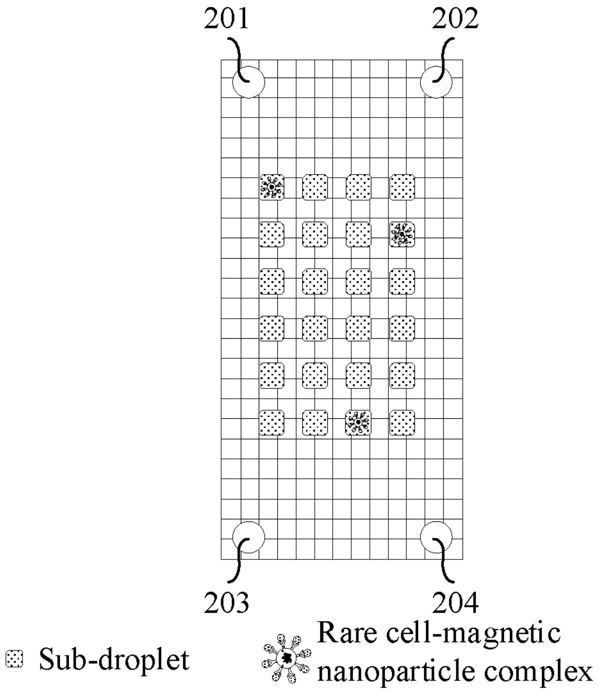
Figure 15C:
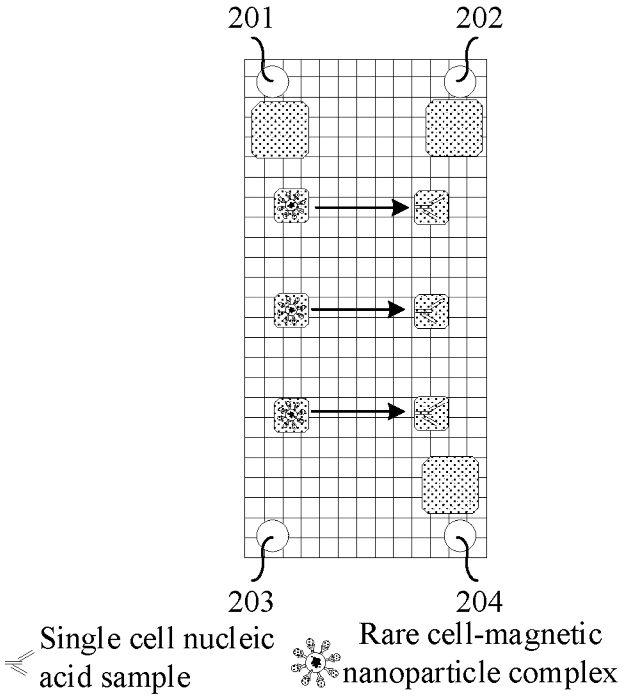

FIGS. 15*a* to 15*c* are schematic diagrams of simplification of a rare cell and a cell cracking processing in a cracking region according to an exemplary embodiment of the present disclosure. In an exemplary implementation mode, the simplification of the rare cell and the cell cracking processing in the cracking region includes following acts.

(21) An act of simplification of a rare cell. After the enriched droplet obtained in the screening region 100 is moved to the cracking region 200, several drops of the second buffer liquid are injected into the cracking region 200 from the cracking region third reagent port 203, a drive unit disperses the enriched droplet into several sub-droplets with equal volume using the second buffer liquid, so that each sub-droplet contains only one rare cell-magnetic nanoparticle complex (single cell wrapping) or no rare cell-magnetic nanoparticle complex (vacuole), as shown in FIG. 15*a*.

(22) An act of rare cell impedance detection. A drive unit drives a plurality of sub-droplets to be located within a plurality of drive units respectively in the detection region 210 to form a single cell/vacuole array, and a sub-droplet containing a rare cell-magnetic nanoparticle complex is identified and positioned through the detection apparatus, as shown in FIG. 15*b*.

(23) An act of rare cell cracking. After obtaining position information of the sub-droplet containing the rare cell-magnetic nanoparticle complex, a drive unit drives a vacuole to move to a second waste liquid port 204 for discharge, so as to achieve separation of the sub-droplet containing the rare cell-magnetic nanoparticle complex from the vacuole. Subsequently, several drops of a cracking liquid are injected into the cracking region 200 from the cracking region first reagent port 201, a drive unit drives the cracking liquid to be mixed with the sub-droplet containing the rare cell-magnetic nanoparticle complex to form a cracking droplet. By driving the cracking droplet to move back and forth, the cracking droplet is oscillated and mixed for several times, so that the cracking liquid is fully contacted with a rare cell to crack a cell membrane and completely expose nucleic acid in the rare cell. Subsequently, a drop of the termination liquid is injected into the cracking region 200 from the cracking region second reagent port 202, and a drive unit drives the cracking droplet to be mixed with the termination liquid to terminate a cracking reaction to form a single cell nucleic acid sample, as shown in FIG. 15*c*.

In an exemplary implementation mode, in order to achieve only one rare cell-magnetic nanoparticle complex (single cell wrapping) or no rare cell-magnetic nanoparticle complex (i.e. vacuole) contained in each sub-droplet, a size of a drive electrode in the digital microfluidics chip needs to be set to be matched with a size of the sub-droplet. In the present disclosure, a large-amount averaging method is used for calculating a size of single cell wrapping, and it is considered that a distribution of cells in a droplet obeys the Poisson distribution law, and its function is as follows.

$$f(\lambda:n)=\frac{\lambda^n e^{-\lambda}}{n!}$$

Herein λ is theoretically an average quantity of cells in each droplet, n is a quantity of cells in a droplet, and f (λ; n) represents a wrapping probability that a quantity of cells is n, that is, a percentage of droplets, in each of which a quantity of cells wrapped is n, accounting for a total number of droplets.

When a droplet is diluted to a certain extent, taking a tumor cell as an example, a diameter D of the tumor cell is generally between 10 μm and 20 μm, and a concentration of the tumor cell in a blood sample is about 1 cells/mL to 10 cells/mL. According to a Poisson distribution formula, when λ=1.98, a theoretical single cell wrapping rate is f (1)=27.3%, a characteristic diameter $D_{drop}$ of a droplet is close to 19.8 μm, and a volume $V_{drop}$ of the droplet is close to a level of picoliter (pL), which may achieve single cell wrapping. A volume of a single cell wrapping droplet may be expressed as a following formula.

$$V_{drop}=\frac{\sqrt{2}\pi L^3}{2\sin^3\theta}\left(-\cos\theta+\frac{1}{3}\cos^3\theta\right)$$

$$\frac{L}{H}=-\sqrt{2}\tan\theta$$

Herein θ represents an initial contact angle between a droplet and a hydrophobic surface on a first substrate, and is generally close to 120°, H represents a box thickness of a digital microfluidics chip, and L represents a size of a single drive electrode.

Figure 16:
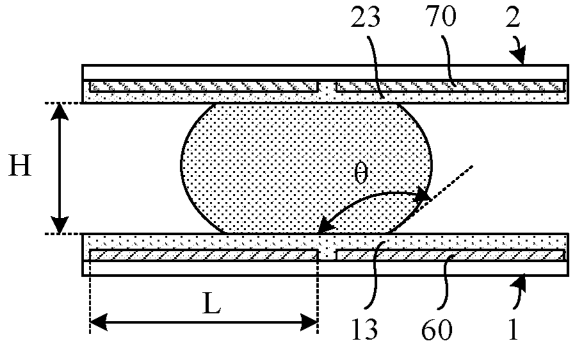
FIG. 16 is a schematic diagram of a droplet in a digital microfluidics chip.

FIG. 16 is a schematic diagram of a droplet in a digital microfluidics chip. As shown in FIG. 16, a box thickness H of a digital microfluidics chip refers to a distance between a first lyophobic layer 13 in a first substrate 1 and a second lyophobic layer 23 in a second substrate 2, and a size L of a drive electrode refers to a length of the drive electrode along a moving direction of a droplet. In order to achieve single cell wrapping, that is, a volume $V_{drop}$ of a single sub-droplet is close to a pL level, according to the above formula, when the box thickness H of the digital microfluidics chip is ≤19.8 μm, the size L of the single drive electrode is ≤48.5 μm.

Figure 17:
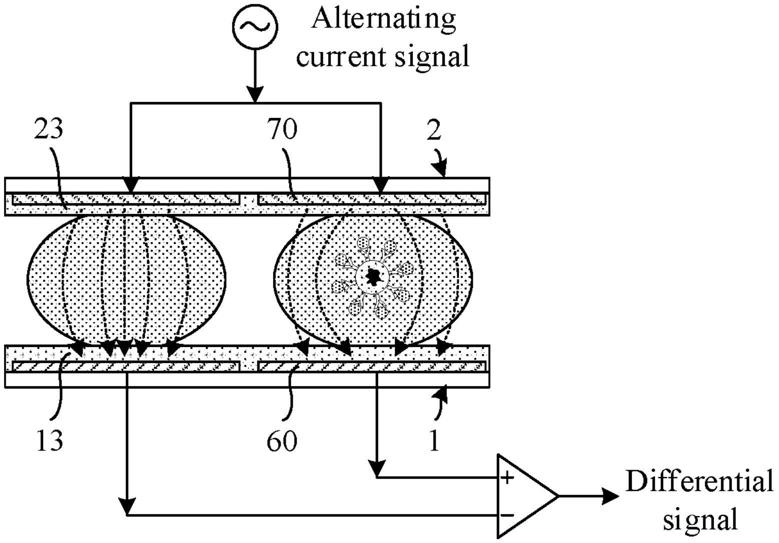
FIGS. 17 and 18 are schematic diagrams of a principle of an impedance analysis method.
Figure 18:
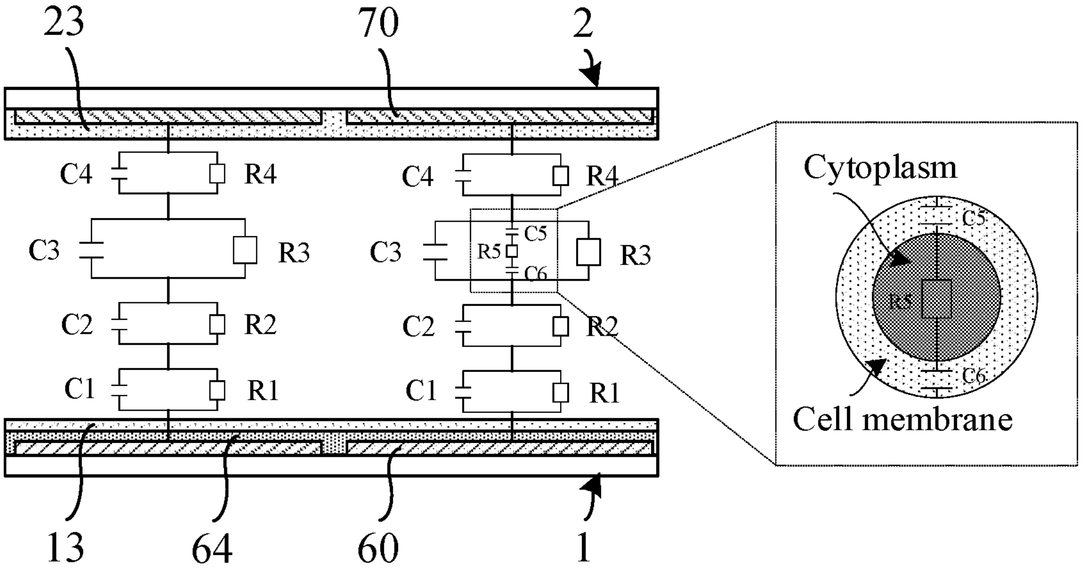

FIG. 17 is a schematic diagram of a principle of an impedance analysis method, and FIG. 18 is a schematic diagram of an equivalent impedance of a vacuole and single cell wrapping in FIG. 17. As shown in FIG. 17, in an exemplary implementation mode, an impedance analysis method may be used for a detection unit to identify and position a sub-droplet containing a rare cell-magnetic nanoparticle complex, an alternating current signal (a dashed line in FIG. 17 indicates an electric field line) is applied between a drive electrode 60 and an opposite electrode 70 in a region where each sub-droplet is located, and an impedance signal of each sub-droplet is detected. By comparing impedance signals of adjacent sub-droplets and performing a differential operation, presence and position of a rare cell may be determined. As shown in FIG. 17, for a vacuole, an impedance between the drive electrode 60 and the opposite electrode 70 may include an impedance of the dielectric layer 64 (a resistance R1 of the dielectric layer and a capacitance C1 of the dielectric layer), an impedance of the first lyophobic layer 13 (a resistance R2 of the first lyophobic layer and a capacitance C2 of the first lyophobic layer), an impedance of a droplet (a resistance R3 of the droplet and a capacitance C3 of the droplet), and an impedance of the second lyophobic layer 23 (a resistance R4 of the second lyophobic layer and a capacitance C4 of the second lyophobic layer). For a sub-droplet containing a rare cell-magnetic nanoparticle complex, the impedance between the drive electrode 60 and the opposite electrode 70 may include the impedance of the dielectric layer 64 (R1 and C1), the impedance of first lyophobic layer 13 (R2 and C2), the impedance of the droplet (R3 and C3), an impedance of a single cell wrapping (a resistance R5 of the single cell wrapping, capacitances C5 and C6 of the single cell wrapping), and the impedance of the second lyophobic layer 23 (R4 and C4). In an exemplary implementation mode, the resistance R5 of the single cell wrapping may be a resistance of a cytoplasm, and capacitances C5 and C6 of a complex may be a capacitance of a cell membrane wrapping the cytoplasm.

Figure 19:
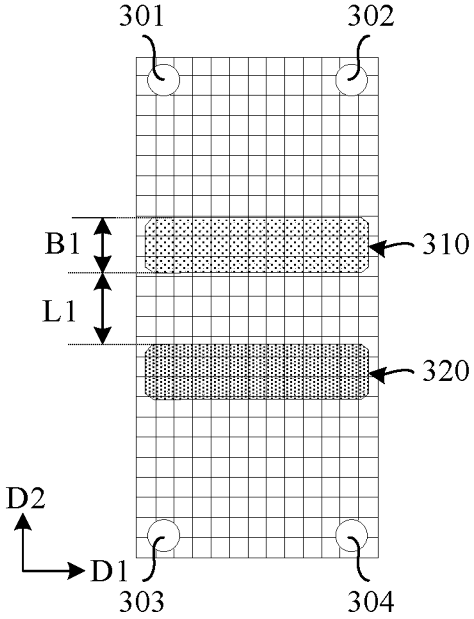
FIG. 19 is a schematic diagram of a planar structure of a pre-amplication region according to an exemplary embodiment of the present disclosure.

FIG. 19 is a schematic diagram of a planar structure of a pre-amplification region according to an exemplary embodiment of the present disclosure. As shown in FIG. 19, in an exemplary implementation mode, the pre-amplification region 300 may include a plurality of drive units arranged in a matrix manner and a plurality of pre-amplification region reagent ports, and the plurality of pre-amplification region reagent ports may include at least a pre-amplification region first reagent port 301, a pre-amplification region second reagent port 302, a pre-amplification region third reagent port 303, and a pre-amplification region fourth reagent port 304 provided on the second substrate.

In an exemplary implementation mode, the pre-amplification region 300 may be in a shape of a rectangle, the plurality of drive units may be arranged in a matrix manner, and the pre-amplification region first reagent port 301, the pre-amplification region second reagent port 302, the pre-amplification region third reagent port 303, and the pre-amplification region fourth reagent port 304 may be respectively disposed in four corner regions of the pre-amplification region 300, so as to prevent a liquid entering the pre-amplification region 300 from the reagent ports from contaminating a cell and affecting a cell processing.

In an exemplary implementation mode, the pre-amplification region first reagent port 301 may be configured to receive a fragmented enzyme reagent injected by an external apparatus, the pre-amplification region second reagent port 302 may be configured to receive a pre-amplification reagent injected by an external apparatus, the pre-amplification region third reagent port 303 may be configured to receive a fragmented buffer liquid injected by an external apparatus, and the pre-amplification region fourth reagent port 304 may be configured to discharge a third waste liquid using an external apparatus.

In an exemplary implementation mode, a quantity, positions, sizes of pre-amplification region reagent ports in the pre-amplification region 300, and a type of a reagent injected from each pre-amplification region reagent port may be set according to actual needs. For example, the pre-amplification region first reagent port 301 is configured to receive a pre-amplification reagent injected by an external apparatus, and the pre-amplification region second reagent port 302 is configured to receive a fragmented enzyme reagent injected by an external apparatus, which is not limited in the present disclosure.

In an exemplary implementation mode, a first temperature control apparatus may be disposed on a side of the first substrate away from the second substrate, or disposed on a side of the second substrate far away from the first substrate, a position is corresponding to a region where the pre-amplification region 300 is located, the first temperature control apparatus is configured to generate a first amplification temperature region 310 and a second amplification temperature region 320 in the pre-amplification region 300, the two amplification temperature regions having different temperatures respectively, and the first amplification temperature region 310 and the second amplification temperature region 320 are configured to achieve a pre-amplification processing of a rare single cell. For example, a temperature of the first amplification temperature region 310 may be about 30° C., and a temperature of the second amplification temperature region 320 may be about 105° C.

In an exemplary implementation mode, the plurality of drive units in the pre-amplification region 300 are configured to perform rare single cell pre-amplification. The plurality of drive units in the pre-amplification region 300 are configured to process a single cell nucleic acid sample into a fragmented DNA sample, mix the fragmented DNA sample with a pre-amplification reagent to form an amplification droplet, and finally obtain a pre-amplified nucleic acid sample of a rare single cell by driving the amplification droplet to move between the first amplification temperature region and the second amplification temperature region.

Figure 20A:
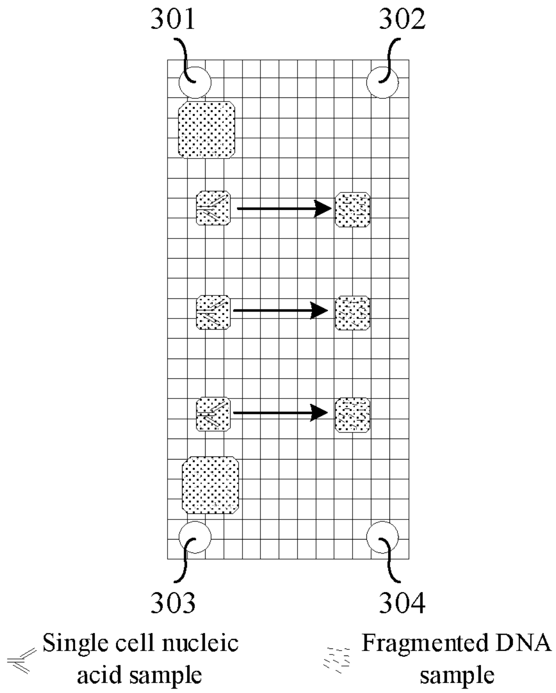
FIGS. 20*a* to 20*c* are schematic diagrams of a rare single cell pre-amplication processing according to the present disclosure.
Figure 20B:
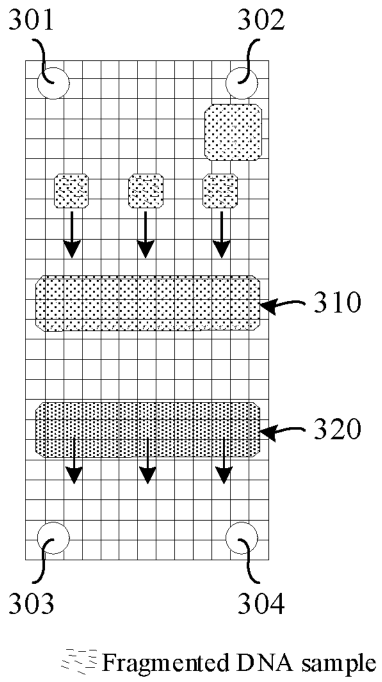
Figure 20C:
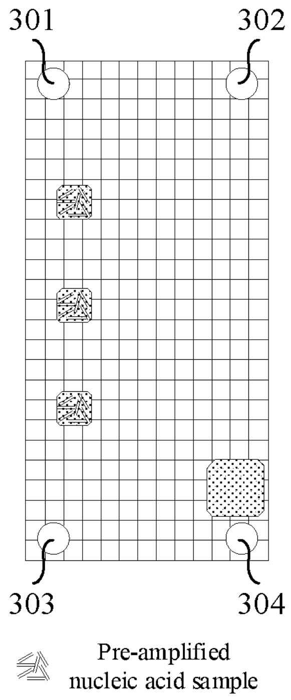

FIGS. 20*a* to 20*c* are schematic diagrams of performing a rare single cell pre-amplification processing in a pre-amplification region according to an exemplary embodiment of the present disclosure. In an exemplary implementation mode, the performing the rare single cell pre-amplification processing in the pre-amplification region may include following acts.

(31) A nucleic acid fragmentation act. After the single cell nucleic acid sample obtained in the cracking region 200 is moved to the pre-amplification region 300, a fragmented enzyme reagent and a fragmented buffer liquid are injected into the pre-amplification region 300 from the pre-amplification region first reagent port 301 and the pre-amplification region third reagent port 303, respectively, a drive unit drives the fragmented enzyme reagent and the fragmented buffer liquid to be mixed with the single cell nucleic acid sample, and a fragmentation processing is carried out, a long-chain DNA sample is uniformly broken into certain lengths to form fragmented DNA samples, as shown in FIG. 20*a*.

(32) A nucleic acid pre-amplification act. A pre-amplification reagent is injected into the pre-amplification region 300 from the pre-amplification region second reagent port 302, and a drive unit drives the pre-amplification reagent to be mixed with a fragmented DNA sample to form an amplification droplet. A first amplification temperature region 310 and a second amplification temperature region 320 are formed in the pre-amplification region 300 through a first temperature control apparatus, a drive unit drives the amplification droplet to move rapidly between the first amplification temperature region 310 and the second amplification temperature region 320, so that the amplification droplet is rapidly heated and cooled, and a pre-amplification processing is performed on the fragmented DNA sample to achieve whole genome pre-amplification at a single cell level, and finally a rare single cell pre-amplified nucleic acid sample is obtained, as shown in FIGS. 20*b* and 20*c*.

In an exemplary implementation mode, a whole genome pre-amplification technique may be a Multiple chain Displacement Amplification (MDA) technique or a Multiple Annealing and Looping Based Amplification Cycles (MALBAC) technique, which is not limited in the present disclosure.

In an exemplary implementation mode, the first amplification temperature region 310 and the second amplification temperature region 320 may be in a shape of a strip extending along a first direction D1, and the first amplification temperature region 310 and the second amplification temperature region 320 may be sequentially disposed along a second direction D2. In an exemplary implementation mode, a thermal conductivity rate of the amplification droplet is directly proportional to a temperature difference between a heat transfer area and an amplification temperature region, and inversely proportional to a pitch between amplification temperature regions. In order to avoid temperature crosstalk between the first amplification temperature region (a low temperature region) and the second amplification temperature region (a high temperature region), a minimum first distance L1 between the first amplification temperature region and the second amplification temperature region may be greater than or equal to 0.1*B1, wherein B1 is a width of the first amplification temperature region or a first width of the second amplification temperature region, and both the first distance L1 and the first width are dimensions in the second direction D2. For example, a first width B1 of a temperature region in a typical PCR application may be about 10 mm, and the minimum first distance L1 between the first amplification temperature region and the second amplification temperature region is greater than or equal to about 1 mm.

In an exemplary implementation mode, the pre-amplification region 300 may include a plurality of temperature regions having different temperatures, and temperatures of the temperature regions, an arrangement manner of the temperature regions, shapes of the temperature regions, and sizes of the temperature regions may be set according to actual needs, and the present disclosure is not limited herein.

Figure 21:
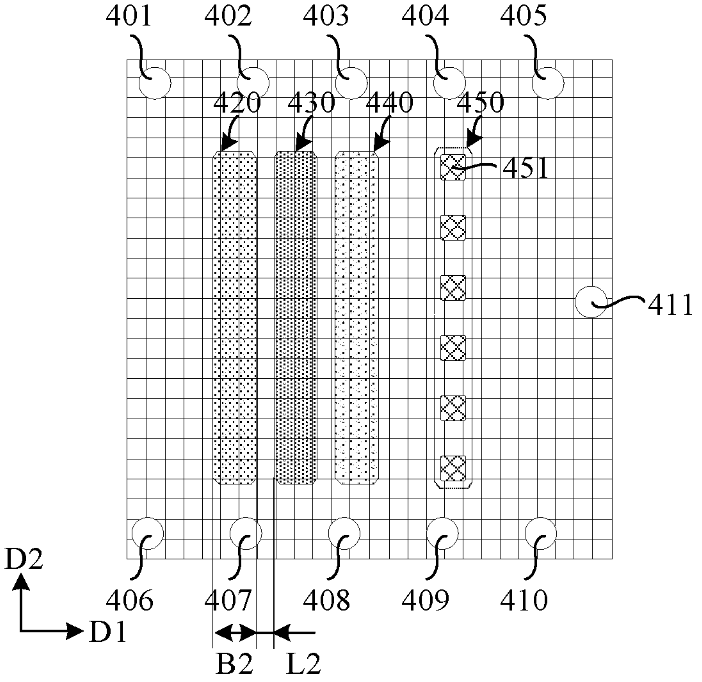
FIG. 21 is a schematic diagram of a planar structure of a library preparation region according to an exemplary embodiment of the present disclosure.

FIG. 21 is a schematic diagram of a planar structure of a library preparation region according to an exemplary embodiment of the present disclosure. As shown in FIG. 21, in an exemplary implementation mode, a library preparation region 400 may include a plurality of drive units arranged in a matrix manner and a plurality of preparation region reagent ports, the plurality of preparation region reagent ports may include at least a preparation region first reagent port 401 disposed on a second substrate, a preparation region second reagent port 402, a preparation region third reagent port 403, a preparation region fourth reagent port 404, a preparation region fifth reagent port 405, a preparation region sixth reagent port 406, a preparation region seventh reagent port 407, a preparation region eighth reagent port 408, a preparation region ninth reagent port 409, a preparation region tenth reagent port 410, and a preparation region eleventh reagent port 411.

In an exemplary implementation mode, the library preparation region 400 may be rectangular, the plurality of drive units may be arranged in a matrix manner, the preparation region first reagent port 401, the preparation region second reagent port 402, the preparation region third reagent port 403, the preparation region fourth reagent port 404, and the preparation region fifth reagent port 405 may be provided in an edge region on a side of the library preparation region 400 in a second direction D2, and may be sequentially arranged along a first direction D1. The preparation region sixth reagent port 406, the preparation region seventh reagent port 407, the preparation region eighth reagent port 408, the preparation region ninth reagent port 409, and the preparation region tenth reagent port 410 may be provided in an edge region on a side of the library preparation region 400 in an opposite direction of the second direction D2, and may be sequentially arranged along the first direction D1. The preparation region eleventh reagent port 411 may be provided in an edge region on a side of the library preparation region 400 in the first direction D1, and may be located in a middle region of the library preparation region 400 in the second direction D2.

In an exemplary implementation mode, the preparation region first reagent port 401, the preparation region fifth reagent port 405, the preparation region sixth reagent port 406, and the preparation region tenth reagent port 410 may be provided in four corner regions of the library preparation region 400, respectively.

In an exemplary implementation mode, the preparation region first reagent port 401 may be configured to receive a clean-up beads liquid injected by an external apparatus, the preparation region second reagent port 402 may be configured to receive an end repair master mix injected from an external apparatus, the preparation region third reagent port 403 may be configured to receive a size selection beads liquid injected by an external apparatus, the preparation region fourth reagent port 404 may be configured to receive an elution buffer liquid injected by an external apparatus, the preparation region fifth reagent port 405 may be configured to receive a library amplification master mix injected by an external apparatus, the preparation region sixth reagent port 406 may be configured to receive an A-tailing master mix injected from an external apparatus, the preparation region seventh reagent port 407 may be configured to receive an adapter liquid injected by an external apparatus, the preparation region eighth reagent port 408 may be configured to receive a ligation master mix injected by an external apparatus, the preparation region ninth reagent port 409 may be configured to receive a wash buffer liquid injected by an external apparatus, the preparation region tenth reagent port 410 may be configured to receive a primer injected by an external apparatus, and the preparation region eleventh reagent port 411 may be configured to discharge a fourth waste liquid using an external apparatus.

In an exemplary implementation mode, a quantity, positions, sizes of preparation region reagent ports in the library preparation region 400, and a type of a reagent injected from each preparation region reagent port may be set according to actual needs. For example, the preparation region first reagent port 401 may be configured to receive an end repair main mix liquid injected by an external apparatus, and the preparation region second reagent port 402 may be configured to receive a clean-up beads injected by an external apparatus, which is not limited in the present disclosure.

In an exemplary implementation mode, a second temperature control apparatus and a second magnetic control apparatus may be disposed on a side of a first substrate away from a second substrate, or disposed on a side of a second substrate away from a first substrate, and a position is corresponding to a region where the library preparation region 400 is located. The second temperature control apparatus is configured to form a first polymerization temperature region 420, a second polymerization temperature region 430, and a third polymerization temperature region 440 arranged in sequence in the library preparation region 400, temperatures of the three polymerization temperature regions are different, and the first polymerization temperature region 420, the second polymerization temperature region 430, and the third polymerization temperature region 440 are configured to implement a PCR thermal cycling processing. For example, a temperature of the first polymerization temperature region 420 may be about 98° C., a temperature of the second polymerization temperature region 430 may be about 72° C., and a temperature of the third polymerization temperature region 440 may be about 60° C. The second magnetic control apparatus is configured to generate a second magnetic field region 450 in the library preparation region 400, the second magnetic field region 450 may include a plurality of second magnetic regions 451 arranged regularly, and an orthographic projection of at least one second magnetic region 451 on the first substrate contains an orthographic projection of at least one drive unit in the library preparation region 400 on the first substrate.

In an exemplary implementation mode, the first polymerization temperature region 420, the second polymerization temperature region 430, and the third polymerization temperature region 440 may be in a shape of a strip extending along the second direction D2, and the first polymerization temperature region 420, the second polymerization temperature region 430, and the third polymerization temperature region 440 may be sequentially disposed along the first direction D1. In order to avoid temperature crosstalk between adjacent polymerization temperature regions, a minimum second distance L2 between adjacent polymerization temperature regions may be greater than or equal to 0.05*B2, wherein B2 is a second width of the first polymerization temperature region, a second width of the second polymerization temperature region, or a second width of the third polymerization temperature region, and both the second distance L2 and the second width are dimensions in the first direction D1. For example, a second width B2 of a temperature region in a typical PCR application may be about 10 mm, and the minimum second distance L2 between adjacent polymerization temperature regions is greater than or equal to about 0.5 mm.

In an exemplary implementation mode, the second magnetic field region 450 may be located on a side of the third polymerization temperature region 440 away from the first polymerization temperature region 420 and the second magnetic field region 450 is configured to implement a sample purification processing. In an exemplary implementation mode, the second magnetic region 451 may be block-shaped, a plurality of second magnetic regions 451 may be sequentially disposed along the second direction D2, and each block-shaped second magnetic region 451 may cover one drive unit. In another exemplary implementation mode, the second magnetic region 451 may be in a shape of a strip extending along the second direction D2 and the strip-shaped second magnetic region 451 may cover a plurality of drive units. In yet another exemplary implementation mode, shapes and sizes of the plurality of second magnetic regions 451 may be the same, or may be different, and the present disclosure is not limited herein.

In an exemplary implementation mode, a plurality of drive units in the library preparation region 400 are configured to perform rare single cell library preparation. The plurality of drive units in the library preparation region 400 are configured to perform end repair on a pre-amplified nucleic acid sample, screen out a DNA fragment with a required length, add A base, adapter, and a target insertion fragment to the DNA fragment, and carry out PCR enrichment and purification to finally obtain a library.

FIGS. **22*a* to 22*c*** are schematic diagrams of performing a rare single cell library preparation processing in a library preparation region according to an exemplary embodiment of the present disclosure. In an exemplary implementation mode, the performing the rare single cell library preparation processing in the library preparation region may include following acts.

Figure 22A:
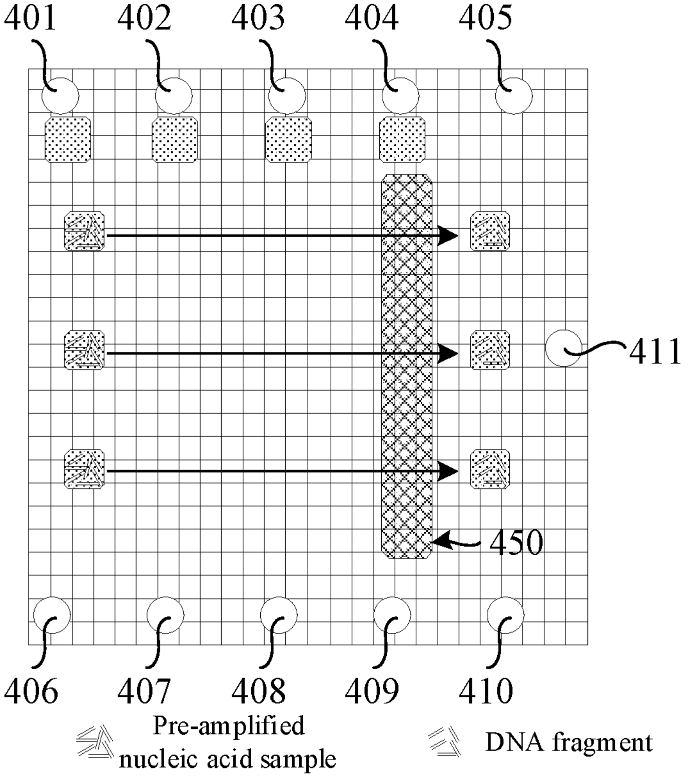
FIGS. 22*a* to 22*c* are schematic diagrams of a rare single cell library preparation processing according to the present disclosure.

(41) End repair and fragment screening acts. After a rare single cell pre-amplified nucleic acid sample obtained in the pre-amplification region is moved to the library preparation region 400, a clean-up bead liquid containing several clean-up beads is injected into the library preparation region 400 from the preparation region first reagent port 401. After a drive unit drives the clean-up beads to be mixed with the pre-amplified nucleic acid sample, the drive unit drives a mixed droplet to move to the second magnetic field region 450, and magnetic bead purification is performed in a magnetic field environment. An elution liquid is injected into the library preparation region 400 from the preparation region fourth reagent port 404 and the drive unit drives the elution liquid to elute the pre-amplified nucleic acid sample. An end repair master mix liquid is injected into the library preparation region 400 from the preparation region second reagent port 402, and the drive unit drives the end repair master mix to be mixed with the pre-amplified nucleic acid sample, and end repair of the pre-amplified nucleic acid sample is performed so that the pre-amplified nucleic acid sample is made into a consistent form satisfying connection of an adapter. A size selection beads liquid containing several size selection beads is injected into the library preparation region 400 from the preparation region third reagent port 403. The drive unit drives the size selection beads to be mixed with the pre-amplified nucleic acid sample, drives a mixed droplet to move to the second magnetic field region 450, and fragment screening is performed in the second magnetic field region 450, and a DNA fragment with a required length may be selectively screened out by controlling a volume of added size selection beads, as shown in FIG. 22*a*.

Figure 22B:
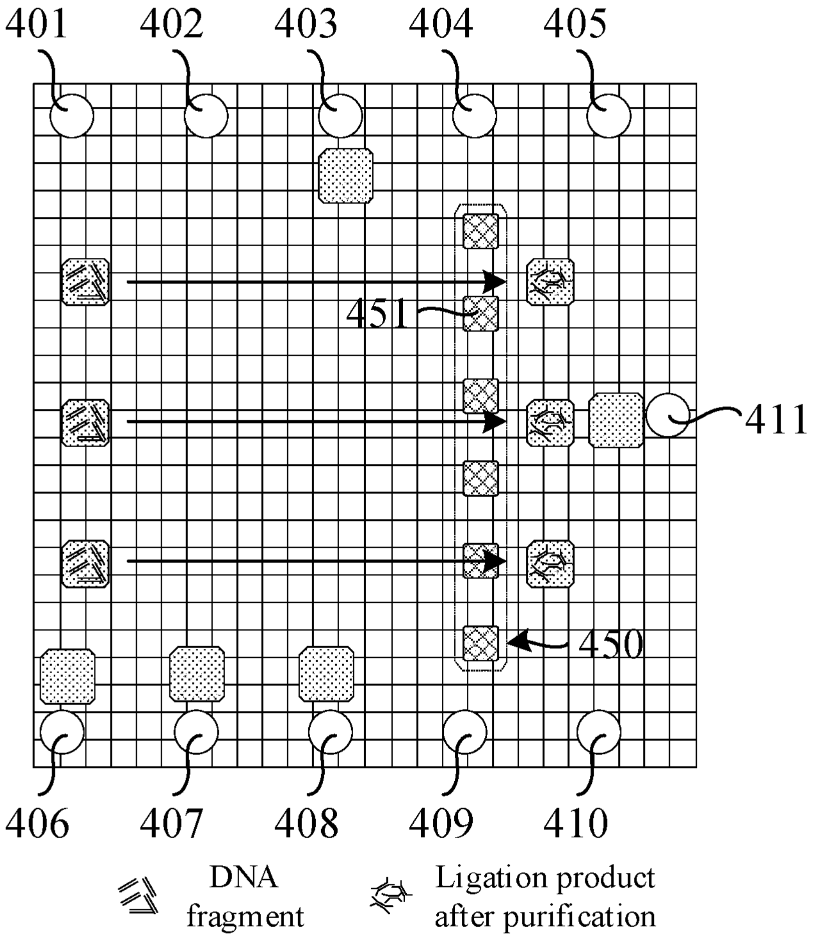

(42) An act of adding A and adding an adapter into a sample. A-tailing master mix liquid is injected into the library preparation region 400 from the preparation region sixth reagent port 406, and the drive unit drives the A-tailing master mix liquid to be mixed with the nucleic acid sample, A bases are added to 3'-ends of all flat end DNAs. Subsequently, a droplet is driven to move to the second magnetic field region 450, and purification is performed on an end-repaired sample in the second magnetic field region 450 using the size selection beads. Subsequently, the adapter liquid and the ligation master mix liquid are injected into the library preparation region 400 from the preparation region seventh reagent port 407 and the preparation region eighth reagent port 408, respectively. A drive unit drives the adapter liquid and the ligation master mix liquid to be mixed with the sample with A added, and the adapter and a target insertion fragment are ligated to the sample under an action of ligase. Subsequently, a droplet is driven to move to the second magnetic field region 450, and the sample is purified using size selection beads in the second magnetic field region 450 to remove a by-product from the sample and obtain a ligation product after purification, as shown in FIG. 22*b*. In an exemplary implementation mode, the by-product may include a free adapter, a DNA fragment whose one end is connected with an adapter and the other end is not connected with an adapter, a DNA fragment whose two ends are not connected with any adapter, or an empty adapter self-connecting, etc.

Figure 22C:
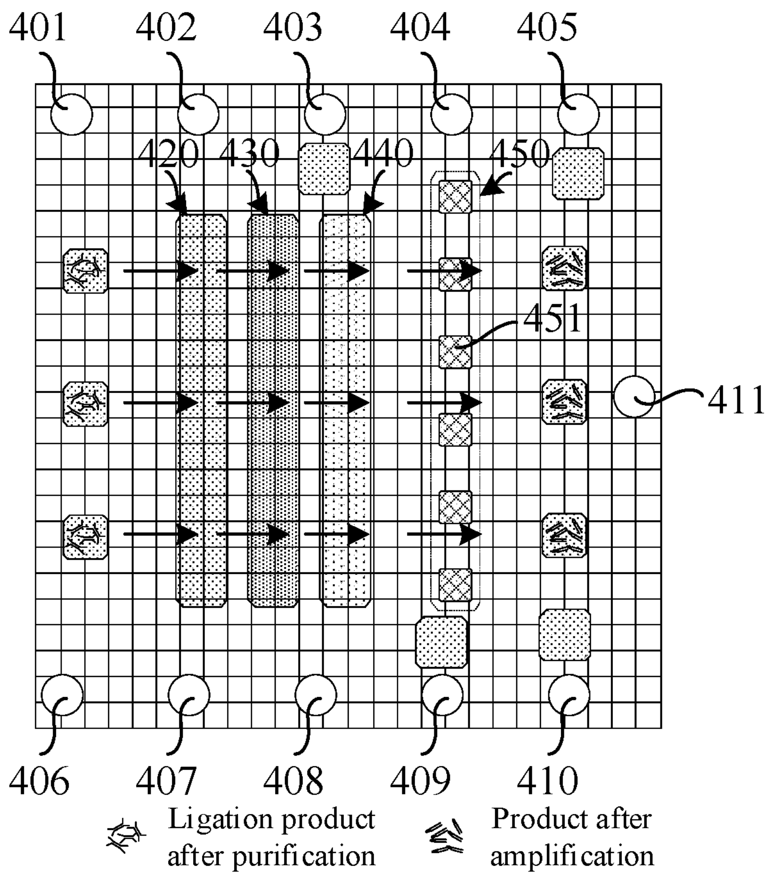

(43) Sample PCR enrichment and purification acts. A library amplification master mix liquid and a primer are injected into the library preparation region 400 from the preparation region fifth reagent port 405 and the preparation region tenth reagent port 410, respectively, A drive unit drives the library amplification master mix and the primer to be mixed with the ligation product after purification, drives a droplet to move back and forth between the first polymerization temperature region 420, the second polymerization temperature region 430, and the third polymerization temperature region 440 so that the droplet undergoes several PCR thermal cycles (e.g. about 5 to 13 cycles) between different temperature regions, and a DNA fragment whose both ends are successfully connected to the adapter is amplified selectively to increase a total amount of a DNA library. A size selection beads liquid is injected into the library preparation region 400 from the preparation region third reagent port 403, and the drive unit drives a product after PCR amplification to be mixed with size selection beads and moved to the second magnetic field region 450, and the sample is purified in the second magnetic field region 450. A wash buffer liquid is injected into the library preparation region 400 from the preparation region ninth reagent port 409, and the drive unit drives the wash buffer liquid to elute the purified sample to obtain a final library. After library quality inspection is performed under a chip, sequencing is performed on a computer, as shown in FIG. 22*c*.

In an exemplary implementation mode, a following solution may be adopted for a PCR thermal cycle.

| Act | Temperature | Duration | Period |
|---|---|---|---|
| Initial denaturation | 98° C. | 45 sec | 1 time |
| Denaturation | 98° C. | 15 sec | Several |
| Annealing | 60° C. | 30 sec | cycles |
| Extension | 72° C. | 30 sec | |
| Final extension | 72° C. | 1 min | 1 time |

An exemplary embodiment of the present disclosure provides a digital microfluidics apparatus, a screening region, a cracking region, a pre-amplification region, and a library preparation region are provided on an active digital microfluidics chip, screening and enrichment of a rare cell is carried out in the screening area, simplification and cell cracking of a rare cell is performed in the cracking region, nucleic acid pre-amplification of a rare single cell is performed in the pre-amplification region, library preparation is performed in the library preparation region for the sample after pre-amplification of the rare single cell, so that an integrated process of capture-separation-library preparation of a rare single cell is achieved, which is fully automated without manual operation, effectively avoiding an error introduced by manual operation in a process of database construction of trace samples, ensuring repeatability and stability of quality of an output library, and providing a powerful guarantee for subsequent single cell sequencing.

Compared with a traditional technique of manually operating to output a library, for the digital microfluidics apparatus provided by the present disclosure, a digital microfluidics chip is cooperated with a temperature control apparatus, a magnetic control apparatus, and a detection apparatus, there is no need to transfer a sample between different cavities, which avoids trace loss and rare sample loss caused by sample transfer between different cavities, and an integrated process of lossless automatic separation of a rare cell and preparation of a single cell sample library may be achieved within the digital microfluidics chip. The present disclosure utilizes an active droplet control function of an active digital microfluidics chip to achieve automatic movement, uniform mixing, separation, and other operations of samples and reagents, sample consumption is low, a speed is high, a manual operation is low, a cost is low, a peripheral micro-pump, a valve, and a complicated pipeline are not needed, and integration of a system is improved; the active digital microfluidics chip is used for achieving an uniform arrangement of single cell droplets, and a rare single cell is identified and located through impedance information through the detection apparatus, accuracy of identification and location is high. The present disclosure does not need a large-scale detection device, and has characteristics of a compact structure, a small volume, low power consumption, a low cost, etc. The present disclosure does not need a tedious sample pretreatment outside a chip, saves samples and reagents, and shortens processing time. A library preparation process of the present disclosure does not need a manual operation, a whole process is automated, problems of a tedious manual library building process, error-prone, and the like are avoided, a library which may be sequenced on a computer is directly output, thus having a good application prospect in early diagnosis of a cancer, cancer heterogeneity, embryo development, and the like.

The present disclosure utilizes magnetic nanoparticles coupled with special antibodies to combine with special antigens on a surface of a rare cell to form a rare cell (target cell)-magnetic nanoparticle complex, and utilizes a first magnetic field region formed by a first magnetic control apparatus to adsorb the magnetic nanoparticles on a surface of a chip, thus achieving separation of the rare cell from other cells. Compared with a traditional single cell separation technology, it may not only obtain the rare cell quickly and accurately, but also ensure integrity of the rare cell without losing and damaging the rare cell. Moreover, it does not need a manual operation, and a separation process is simple, convenient, rapid, and has strong specificity, and has characteristics of a simple operation, short time consumption, and a low cost.

An exemplary embodiment of the present disclosure also provides a drive method of digital microfluidics, which may utilize the aforementioned digital microfluidics chip, which includes a screening region, a cracking region, a pre-amplification region, and a library preparation region arranged in sequence. In an exemplary implementation mode, the drive method may include: S1, performing screening and enrichment for a rare cell in the screening region; S2, performing simplification and cell cracking for the rare cell being performed screening and enrichment in the cracking region; S3, performing nucleic acid pre-amplification for a rare single cell being performed cell cracking in the pre-amplification region; S4, performing library preparation for the sample being performed pre-amplification of the rare single cell in the library preparation region.

In an exemplary implementation mode, the act S1 may include: driving a blood sample, a magnetic particle droplet, and a buffer liquid to mix to form a mixed droplet, wherein the mixed droplet contains a rare cell-magnetic nanoparticle complex; dispersing the mixed droplet into a plurality of sub-droplets, and capturing a sub-droplet containing a cell-magnetic nanoparticle complex by using a magnetic field; and mixing captured sub-droplets into an enriched droplet.

In an exemplary implementation mode, the act S2 may include: dispersing the enriched droplet obtained from the screening region into several sub-droplets after moving the enriched droplet to the cracking region, wherein each sub-droplet only contains one rare cell-magnetic nanoparticle complex or does not contain a rare cell-magnetic nanoparticle complex; forming a plurality of sub-droplets into a single cell/vacuole array, identifying and locating a sub-droplet containing a rare cell-magnetic nanoparticle complex; and performing cracking reaction on the sub-droplet containing the rare cell-magnetic nanoparticle complex to form a single cell nucleic acid sample.

In an exemplary implementation mode, the act S3 may include: performing a fragment processing on the single cell nucleic acid sample after moving the single cell nucleic acid sample obtained from the cracking region to the pre-amplification region, to form fragmented DNA samples; and performing a pre-amplification processing on the fragmented DNA samples to form rare single cell pre-amplified nucleic acid samples.

In an exemplary implementation mode, the act S4 may include: performing end repair on the rare single cell pre-amplified nucleic acid samples in turn after the rare single cell pre-amplified nucleic acid samples obtained from the pre-amplification region are moved to the library preparation region, and selectively screening out DNA fragments with a required length by using a magnetic field; performing a processing of adding A and a processing of adding an adapter sequentially to the DNA fragments with the required length to obtain ligation products after purification; and performing a purification processing and an elution processing sequentially after performing a Polymerase Chain Reaction (PCR) thermal cycling processing on the ligated product, to obtain a library.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A digital microfluidics chip, comprising a first substrate and a second substrate disposed oppositely, wherein a plurality of drive regions are disposed on the first substrate, at least one drive region comprises a drive transistor, a drive electrode, and a storage capacitor, the drive electrode is connected with the drive transistor and the storage capacitor respectively, the storage capacitor is configured to be charged when the drive transistor is turned on, and to maintain a voltage signal on the drive electrode when the drive transistor is turned off, and wherein the first substrate and the second substrate form a processing cavity through a sealant, the processing cavity comprises at least a screening region, a cracking region, a pre-amplification region, and a library preparation region, the screening region is configured to perform screening and enrichment of a rare cell, the cracking region is disposed on a side of the screening region, and is configured to perform simplification and cell cracking of the rare cell being performed screening and enrichment, the pre-amplification region is disposed on a side of the cracking region away from the screening region, and is configured to perform nucleic acid pre-amplification of a rare single cell being performed cell cracking, and the library preparation region is disposed on a side of the pre-amplification region away from the screening region, and is configured to perform library preparation for a sample being performed pre-amplification of the rare single cell.

2. The digital microfluidics chip according to claim 1, wherein a plurality of gate lines and a plurality of data lines are disposed on the first substrate, the plurality of gate lines and the plurality of data lines are intersected to each other to define a plurality of drive regions, in at least one drive region, the drive transistor comprises at least a first gate electrode, a second gate electrode, a first electrode, and a second electrode, the first gate electrode and the second gate electrode are connected with a gate line, the first electrode is connected with a data line, and the second electrode is connected with the drive electrode.

3. The digital microfluidics chip according to claim 1, wherein the at least one drive region further comprises a capacitor electrode, an orthographic projection of the capacitor electrode on the first substrate and an orthographic projection of the drive electrode on the first substrate are at least partially overlapped, and the capacitor electrode and the drive electrode form the storage capacitor.

4. The digital microfluidics chip according to claim 3, wherein the capacitor electrode is connected with a system ground signal.

5. The digital microfluidics chip according to claim 1, wherein in at least one drive region, the first substrate comprises:

a first base substrate;

a first conductive layer disposed on the first base substrate, wherein the first conductive layer comprises at least a gate line, a first gate electrode, and a second gate electrode, and the first gate electrode and the second gate electrode are respectively connected with a gate line;

a first insulation layer covering the first conductive layer;

a semiconductor layer disposed on a side of the first insulation layer away from the first base substrate, wherein the semiconductor layer comprises at least a first active layer and a second active layer, an orthographic projection of the first active layer on the first base substrate is at least partially overlapped with an orthographic projection of the first gate electrode on the first base substrate, and an orthographic projection of the second active layer on the first base substrate is at least partially overlapped with an orthographic projection of the second gate electrode on the first base substrate;

a second conductive layer disposed on a side of the semiconductor layer away from the first base substrate, wherein the second conductive layer comprises at least a data line, a first electrode, a connection electrode, and a second electrode, a first terminal of the first electrode is connected with the data line, a second terminal of the first electrode and a first terminal of the connection electrode are respectively disposed on the first active layer, and a second terminal of the connection electrode and a first terminal of the second electrode are respectively disposed on the second active layer;

a second insulation layer covering the second conductive layer;

a third conductive layer disposed on a side of the second insulation layer away from the first base substrate, wherein the third conductive layer comprises at least a capacitor electrode;

a third insulation layer covering the third conductive layer, wherein a connection via hole is disposed on the third insulation layer, and the connection via hole exposes the second electrode;

a fourth conductive layer disposed on a side of the third insulation layer away from the first base substrate, wherein the fourth conductive layer comprises at least a drive electrode, the drive electrode is connected with the second electrode through the connection via hole, an orthographic projection of the drive electrode on the first base substrate is at least partially overlapped with an orthographic projection of the capacitor electrode on the first base substrate, and the capacitor electrode and the drive electrode form the storage capacitor.

6. The digital microfluidics chip according to claim 1, wherein a plurality of opposite electrodes are provided on the second substrate, and the drive electrode and an opposite electrode form a drive unit for driving a droplet to move.

7. The digital microfluidics chip according to claim 1, wherein the screening region comprises a plurality of drive units, and a screening region first reagent port, a screening region second reagent port, a screening region third reagent port, and a screening region fourth reagent port respectively disposed in corner regions of the screening region, at least one of the screening region first reagent port, the screening region second reagent port, the screening region third reagent port, and the screening region fourth reagent port is configured to receive a whole blood sample, or to receive magnetic nanoparticles, or to receive a buffer liquid, or to discharge a waste liquid.

8. The digital microfluidics chip according to claim 1, wherein the screening region comprises a first magnetic field region, the first magnetic field region comprises a plurality of first magnetic regions arranged regularly, and an orthographic projection of at least one first magnetic region on the first substrate contains an orthographic projection of at least one drive unit on the first substrate.

9. The digital microfluidics chip according to claim 1, wherein the screening region comprises a plurality of drive units, and a cracking region first reagent port, a cracking region second reagent port, a cracking region third reagent port, and a cracking region fourth reagent port respectively disposed in corner regions of the screening region, at least one of the cracking region first reagent port, the cracking region second reagent port, the cracking region third reagent port, and the cracking region fourth reagent port is configured to receive a cracking liquid, or to receive a termination liquid, or to receive a buffer liquid, or to discharge a waste liquid.

10. The digital microfluidics chip according to claim 9, wherein a drive unit in the screening region satisfies a following formula:

$$\frac{L}{H} = -\sqrt{2}\tan\theta$$

wherein θ represents an initial contact angle between a droplet and a hydrophobic surface of the first substrate, H represents a box thickness of the digital microfluidics chip, and L represents a size of the drive electrode.

11. The digital microfluidics chip according to claim 10, wherein the box thickness H of the digital microfluidics chip is less than or equal to 19.8 μm and the size L of the drive electrode is less than or equal to 48.5 μm.

12. The digital microfluidics chip according to claim 9, wherein a drive unit in the screening region is configured to detect an impedance signal of a single cell wrapping and a vacuole, and an impedance of the single cell wrapping comprises a resistance of a cytoplasm and a capacitance of a cell membrane wrapping the cytoplasm.

13. The digital microfluidics chip according to claim 1, wherein the pre-amplification region comprises a plurality of drive units, and a pre-amplification region first reagent port, a pre-amplification region second reagent port, a pre-amplification region third reagent port, and a pre-amplification region fourth reagent port respectively disposed in corner regions of the pre-amplification region, at least one of the pre-amplification region first reagent port, the pre-amplification region second reagent port, the pre-amplification region third reagent port, and the pre-amplification region fourth reagent port is configured to receive a fragmented enzyme reagent, or to receive a pre-amplification reagent, or to receive a fragmentation buffer liquid, or to discharge a waste liquid.

14. The digital microfluidics chip according to claim 1, wherein the pre-amplification region comprises a plurality of amplification temperature regions having different temperatures, and a distance between adjacent amplification temperature regions is greater than or equal to 1 mm.

15. The digital microfluidics chip according to claim 1, wherein the library preparation region comprises a plurality of drive units, and a preparation region first reagent port, a preparation region second reagent port, a preparation region third reagent port, a preparation region fourth reagent port, a preparation region fifth reagent port, a preparation region sixth reagent port, a preparation region seventh reagent port, a preparation region eighth reagent port, a preparation region ninth reagent port, a preparation region tenth reagent port, and a preparation region eleventh reagent port respectively disposed in edge regions of the library preparation region; the preparation region first reagent port, the preparation region second reagent port, the preparation region third reagent port, the preparation region fourth reagent port, and the preparation region fifth reagent port are disposed in an edge region on a side of the library preparation region in a second direction, and are sequentially disposed along a first direction, the preparation region sixth reagent port, the preparation region seventh reagent port, the preparation region eighth reagent port, the preparation region ninth reagent port, and the preparation region tenth reagent port are disposed in an edge region on a side of the library preparation region in an opposite direction of the second direction, and are sequentially disposed along the first direction, the preparation region eleventh reagent port is disposed in an edge region on a side of the library preparation region in the first direction; at least one of a plurality of preparation region reagent ports of the library preparation region is configured to: receive a clean-up beads liquid, or receive an end repair master mix liquid, or receive a size selection beads liquid, or receive an eluent liquid, or receive a library amplification master mix liquid, or receive an A-tailing master mix liquid, or receive an adapter liquid, or receive a ligation master mix liquid, or receive a wash buffer liquid, or receive a primer, or discharge a waste liquid.

16. The digital microfluidics chip according to claim 1, wherein the library preparation region comprises a plurality of polymerization temperature regions having different temperatures, and a distance between adjacent polymerization temperature regions is greater than or equal to 0.5 mm.

17. The digital microfluidics chip according to claim 1, wherein the library preparation region comprises a second magnetic field region, the second magnetic field region comprises a plurality of second magnetic regions arranged regularly, and an orthographic projection of at least one second magnetic region on the first substrate contains an orthographic projection of at least one drive unit on the first substrate.

18. A digital microfluidic apparatus, comprising the digital microfluidics chip according to claim 1, and further comprising a temperature control apparatus, a magnetic control apparatus, and a detection apparatus, wherein the temperature control apparatus is configured to generate at least one temperature region on the digital microfluidics chip, the magnetic control apparatus is configured to generate at least one magnetic field region on the digital microfluidics chip, the detection apparatus is configured to identify and locate the rare cell, and the digital microfluidics chip is configured to sequentially perform the screening and the enrichment of the rare cell, the simplification and the cell cracking of the rare cell, the nucleic acid pre-amplification of the rare single cell, and the library preparation for the sample.

19. A drive method for a digital microfluidics chip, wherein the digital microfluidics chip comprises a first substrate and a second substrate disposed oppositely; wherein the first substrate and the second substrate form a processing cavity through a sealant, the processing cavity comprises at least a screening region, a cracking region, a pre-amplification region, and a library preparation region disposed in sequence, and the drive method comprises:

performing screening and enrichment of a rare cell in the screening region;

performing simplification and cell cracking of the rare cell being performed screening and enrichment in the cracking region, wherein the cracking region is disposed on a side of the screening region;

performing nucleic acid pre-amplification of a rare single cell being performed cell cracking in the pre-amplification region, wherein the pre-amplification region is disposed on a side of the cracking region away from the screening region; and performing library preparation for a sample being performed pre-amplification of the rare single cell in the library preparation region, wherein the library preparation region is disposed on a side of the pre-amplification region away from the screening region.

* * * * *